United States Patent
Yamagishi et al.

(10) Patent No.: US 10,637,569 B2
(45) Date of Patent: Apr. 28, 2020

(54) OPTICAL TRANSMISSION CHARACTERISTIC ESTIMATION METHOD, OPTICAL TRANSMISSION CHARACTERISTIC COMPENSATION METHOD, OPTICAL TRANSMISSION CHARACTERISTIC ESTIMATION SYSTEM AND OPTICAL TRANSMISSION CHARACTERISTIC COMPENSATION SYSTEM

(71) Applicants: NTT Electronics Corporation, Yokohama-shi, Kanagawa (JP); NIPPON TELEGRAPH AND TELEPHONE CORPORATION, Tokyo (JP)

(72) Inventors: Akihiro Yamagishi, Kanagawa (JP); Tetsuya Maruyama, Kanagawa (JP); Masanori Nakamura, Kanagawa (JP); Asuka Matsushita, Kanagawa (JP); Shogo Yamanaka, Kanagawa (JP)

(73) Assignees: NTT ELECTRONICS CORPORATION, Yokohama-shi, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/470,800

(22) PCT Filed: Nov. 8, 2017

(86) PCT No.: PCT/JP2017/040304
§ 371 (c)(1),
(2) Date: Jun. 18, 2019

(87) PCT Pub. No.: WO2018/168061
PCT Pub. Date: Sep. 20, 2018

(65) Prior Publication Data
US 2020/0036440 A1 Jan. 30, 2020

(30) Foreign Application Priority Data

Mar. 14, 2017 (JP) .................. 2017-048033

(51) Int. Cl.
H04B 10/079 (2013.01)
H04B 10/40 (2013.01)
(Continued)

(52) U.S. Cl.
CPC ........ H04B 10/0795 (2013.01); H04B 10/40 (2013.01); H04B 10/58 (2013.01);
(Continued)

(58) Field of Classification Search
None
See application file for complete search history.

(56) References Cited

U.S. PATENT DOCUMENTS

2009/0201796 A1\* 8/2009 Roberts .................. H04B 10/60
370/210

FOREIGN PATENT DOCUMENTS

JP 6077696 B1 2/2017

OTHER PUBLICATIONS

Notification of Transmittal of Translation of the International Preliminary Report on Patentability and written opinion of the International Searching Authority issued for corresponding International Patent Application No. PCT/JP2017/040304, dated Sep. 30, 2019.
(Continued)

Primary Examiner — Darren E Wolf
(74) Attorney, Agent, or Firm — Myers Wolin, LLC

(57) ABSTRACT

A method estimating transmission characteristics of an optical transmitter of a transmission unit and an optical receiver of a reception unit, including: estimating a temporary transfer or inverse transfer function of the optical receiver; estimating a transfer or inverse transfer function of the
(Continued)

optical transmitter from first data acquired by the reception unit when a first known signal is transmitted from the transmission unit, and the estimated temporary transfer or inverse transfer function of the optical receiver, a difference between the first known signal and an original first known signal is minimized; and estimating a transfer or inverse transfer function of the optical receiver from second data acquired by the reception unit when a second known signal is transmitted from the transmission unit, and the estimated transfer or inverse transfer function of the optical transmitter, a difference between the second known signal and an original second known signal is minimized.

15 Claims, 19 Drawing Sheets

(51) Int. Cl.

| | | |
|---|---|---|
| *H04B 10/61* | (2013.01) | |
| *H04B 10/00* | (2013.01) | |
| *H04B 17/00* | (2015.01) | |
| *H04B 10/50* | (2013.01) | |
| *H04B 10/60* | (2013.01) | |
| *H04B 10/58* | (2013.01) | |
| *H04B 10/43* | (2013.01) | |
| *H04B 10/25* | (2013.01) | |

(52) U.S. Cl.
CPC ............. *H04B 10/61* (2013.01); *H04B 10/00* (2013.01); *H04B 10/12* (2013.01); *H04B 10/14* (2013.01); *H04B 10/142* (2013.01); *H04B 10/152* (2013.01); *H04B 10/225* (2013.01); *H04B 10/25* (2013.01); *H04B 10/2503* (2013.01); *H04B 10/43* (2013.01); *H04B 10/50* (2013.01); *H04B 10/60* (2013.01); *H04B 17/00* (2013.01)

(56) References Cited

OTHER PUBLICATIONS

Rios-Müller et al., "Blind Receiver Skew Compensation and Estimation for Long-Haul Non-Dispersion Managed Systems Using Adaptive Equalizer", Journal of Lightwave Technology, vol. 33, No. 7, Apr. 1, 2015, pp. 1315-1318.

Diniz et al., "Joint IQ Skew and Chromatic Dispersion Estimation for Coherent Optical Communication Receivers", Advanced Photonics Congress 2016 (IPR, NOMA, Sensors, Networks, SPPCom, SOF) Copyright OSA 2016.

Khanna et al., "A Robust Adaptive Pre-Distortion Method for Optical Communication Transmitters", IEEE Photonics Technology Letters, vol. 28, No. 7, Apr. 1, 2016, pp. 752-755.

\* cited by examiner

OPTICAL TRANSMISSION CHARACTERISTIC ESTIMATION METHOD, OPTICAL TRANSMISSION CHARACTERISTIC COMPENSATION METHOD, OPTICAL TRANSMISSION CHARACTERISTIC ESTIMATION SYSTEM AND OPTICAL TRANSMISSION CHARACTERISTIC COMPENSATION SYSTEM

CROSS REFERENCE TO RELATED APPLICATIONS

This application is a National Phase application under 35 U.S.C. 371, of international application No. PCT/JP2017/0040304, filed on Nov. 8, 2017, now pending, which claims foreign priority to Japanese Patent Application No. 2017-048033, filed on Mar. 14, 2017, the contents of each are herein wholly incorporated by reference.

FIELD

The present invention relates to an optical transmission characteristic estimation method, an optical transmission characteristic compensation method, an optical transmission characteristic estimation system, and an optical transmission characteristic compensation system estimating or compensating the transmission characteristics of an optical transceiver in optical communication.

BACKGROUND

To cope with increase of communication traffic, increase of speed and capacity of an optical transceiver is demanded. In recent years, the optical transceiver increasingly introduced uses a digital coherent technology that is combination of digital signal processing (DSP) and coherent detection.

The optical transceiver of a transmission rate of 100 Gb/s per one channel uses, for example, a modulation system of PDM-QPSK (polarization division multiplexing-quadrature phase shift keying) at Baud rate of 32 Gbaud. An optical transmitter modulates each of linear polarized light (X-polarized wave and Y-polarized wave) orthogonal to each other by QPSK baseband signals to generate PDM-QPSK optical signals. An optical receiver converts the received optical signals into baseband signals through the coherent detection of the optical signals and local oscillation light, and demodulates the QPSK by the digital signal processing (DSP) to reproduce transmission data.

To increase the transmission capacity per one channel, the optical transceiver of a transmission rate of 400 Gb/s uses, for example, a modulation system of PDM-16QAM (polarization division multiplexing-16 quadrature amplitude modulation) at Baud rate of 64 Gbaud, or a modulation system of PDM-64QAM at Baud rate of 43 Gbaud. As described above, in the future optical transceiver, increase of Baud rate and multi-valuing of the modulation system progress in order to increase the transmission capacity per one channel.

The optical transceiver is required to have excellent transmission characteristics in a wide range along with increase of Baud rate and multi-valuing. The transmission characteristics of a transmission signal in the optical transceiver are represented by a transfer function. The optical transceiver generally includes a plurality of lanes (in-phase component XI of X-polarized wave, quadrature component XQ of X-polarized wave, in-phase component YI of Y-polarized wave, and quadrature component YQ of Y-polarized wave), and is required to sufficiently suppress difference of the transfer function among the lanes because the difference of the transfer function among the lanes causes deterioration of total transmission characteristics of the system. In a case where frequency characteristics of the transfer function of the optical transceiver are insufficient or a case where the frequency characteristics are different among the lanes, it is necessary to compensate the transmission characteristics or the difference among the lanes by, for example, the DSP. On this issue, a method in which chromatic dispersion of an optical transmission line or the difference among the lanes on reception side is compensated by the reception side (for example, see NPLs 1 and 2), and a method in which the difference among the lanes on transmission side is compensated by the transmission side (for example, see PTL 1 and NPL 3) have been proposed.

CITATION LIST

Patent Literature

[PTL 1] Japanese Patent No. 6077696

Non Patent Literature

[NPL 1] R. R. Muller, J. Renaudier, "Blind Receiver Skew Compensation and Estimation for Long-Haul Non-Dispersion Managed Systems Using Adaptive Equalizer", JOURNAL OF LIGHTWAVE TECHNOLOGY, VOL. 33, NO. 7, pp. 1315-1318, Apr. 1, 2015.

[NPL 2] J. C. M. Diniz, E. P da Silva, M. Piels, and D. Zibar, "Joint IQ Skew and Chromatic Dispersion Estimation for Coherent Optical Communication Receivers", Advanced Photonics Congress 2016.

[NPL 3] Ginni Khanna, Bernhard Spinnler, Stefano Calabrò, Erik De Man, and Norbert Hanik, "A Robust Adaptive Pre-Distortion Method for Optical Communication Transmitters", IEEE PHOTONICS TECHNOLOGY LETTERS, VOL. 28, NO. 7, pp. 752-755, Apr. 1, 2016.

Technical Problem

To compensate the transfer function of the optical transceiver by the DSP, it is necessary to previously grasp transfer functions of an optical circuit, an analog electric circuit, and the like of the optical transceiver, and to set a compensation value based on the transfer functions as necessary. The optical transmitter and the optical receiver each have frequency characteristics of the transfer function requiring compensation based on Baud Rate. In a case where the compensation value for compensation of the above-described transfer function is set in an existing optical transceiver, the compensation value is set to an optical transmitter compensation unit and a receiver compensation unit based on, for example, a specification value of the transfer function provided from an optical circuit vender or an analog electric circuit vender or an evaluation result of the previously-measured transfer function of a representative individual, which makes it possible to achieve sufficient total transmission characteristics.

In the high-speed transmission system of a transmission rate of 400 Gb/s or the like, along with the increase of Baud rate and the multi-valuing, the sufficient total transmission characteristics cannot be achieved by setting of the compensation value based on the specification value provided from the vender or the evaluation result of the representative individual, due to individual variation of the transfer function of the optical circuit or the analog electric circuit.

The present invention is made to solve the above-described issues, and an object of the present invention is to provide an optical transmission characteristic estimation method, an optical transmission characteristic compensation method, an optical transmission characteristic estimation system, and an optical transmission characteristic compensation system that each can estimate or compensate transmission characteristics of an optical transceiver.

Solution to Problem

An optical transmission characteristic estimation method according to the present invention estimating optical transmission characteristics of an optical transceiver by an optical transmission characteristic estimation system, includes: a first step of estimating a transfer function or an inverse transfer function of an optical transmitter from first data acquired by a reception unit when a first known signal is transmitted from a transmission unit to the reception unit of the optical transceiver, and a temporary transfer function or a temporary inverse transfer function of an optical receiver of the reception unit; and a second step of estimating a transfer function or an inverse transfer function of the optical receiver from second data acquired by the reception unit when a second known signal is transmitted from the transmission unit to the reception unit, and the estimated transfer function or the estimated inverse transfer function of the optical transmitter.

Advantageous Effects of Invention

The present invention makes it possible to estimate transmission characteristics of an optical transceiver.

DESCRIPTION OF EMBODIMENTS

Figure 1:
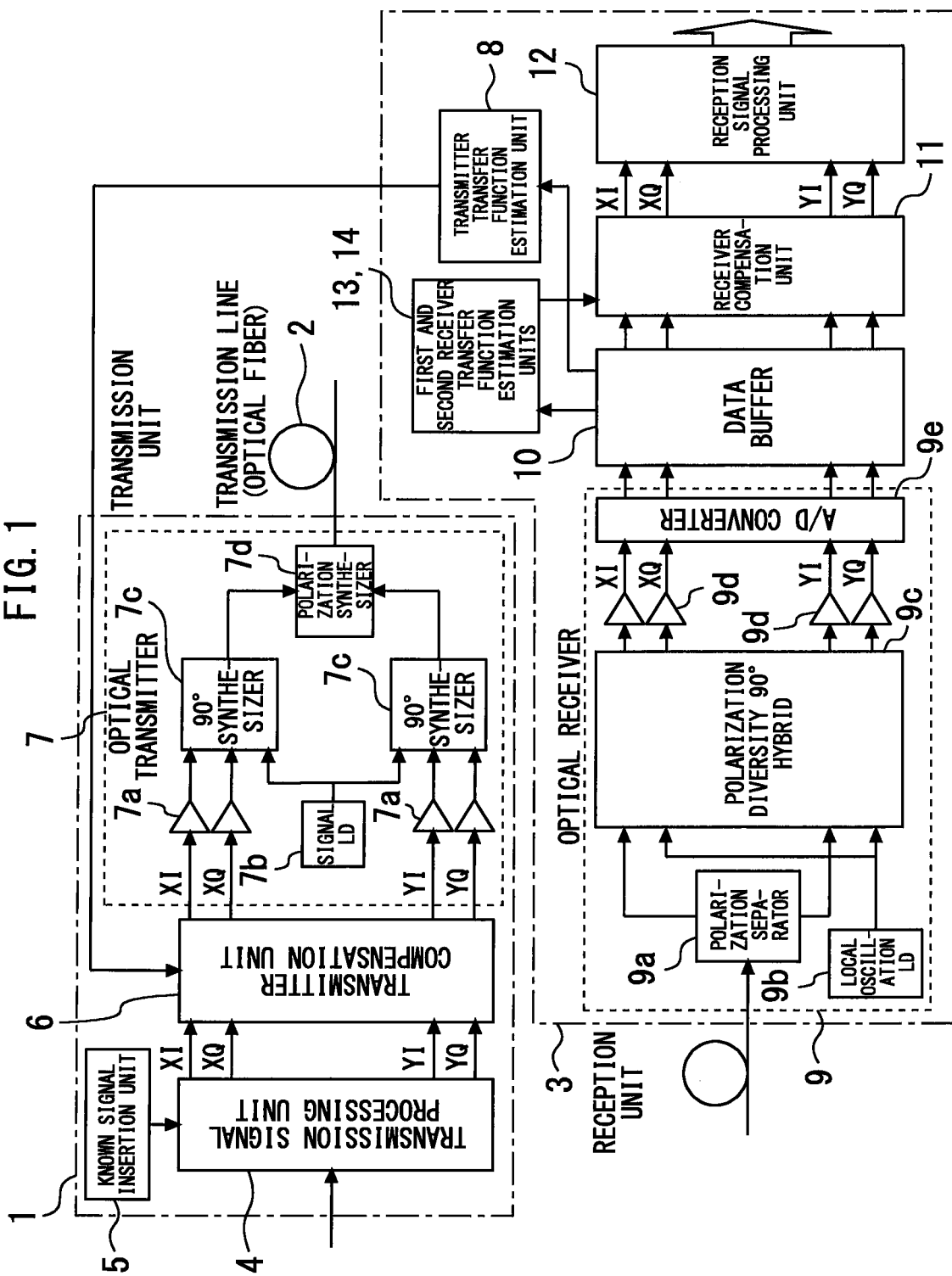
FIG. 1 is a diagram illustrating an optical transceiver including the optical transmission characteristic estimation system and the optical transmission characteristic compensation system according to the embodiment of the present invention.

An optical transmission characteristic estimation method, an optical transmission characteristic compensation method, an optical transmission characteristic estimation system, and an optical transmission characteristic compensation system according to an embodiment of the present invention are described with reference to drawings. Identical or corresponding components are denoted by the same reference numerals, and overlapped description may be omitted in some cases. Note that a term "transfer function" used in the following description is not limited to a predetermined function representing transmission characteristics of an apparatus, a component, a propagation path, and the like, and may indicate any of a function, an expression, a circuit, a line, and the like representing transmission characteristics between given two points. Further, the transfer function is not limited to a linear function, and may be a function representing nonlinear characteristics, or the like. Moreover, terms "transmission" and "transfer" are handled as the same meaning within the scope of the present invention.

FIG. 1 is a diagram illustrating an optical transceiver including the optical transmission characteristic estimation system and the optical transmission characteristic compensation system according to the embodiment of the present invention. A transmission unit 1 transmits an optical signal to a reception unit 3 through a transmission line 2. The transmission line 2 includes, for example, an optical fiber and an optical amplifier.

The transmission unit 1 includes a transmission signal processing unit 4, a known signal insertion unit 5, a transmitter compensation unit 6, and an optical transmitter 7. A part or all of the transmission signal processing unit 4, the known signal insertion unit 5, and the transmitter compensation unit 6 are configured of hardware such as an ASIC (Application Specific Integrated Circuit) and an FPGA (Field-Programmable Gate Array). Further, a part or all of the units may be configured of software that functions when a processor such as a CPU (Central Processing Unit) executes a program stored in a storage unit.

The known signal insertion unit 5 inserts a sequence of a known signal to a modulation target signal sequence of each of an XI lane (first lane), an XQ lane (second lane), a YI lane (third lane), and a YQ lane (fourth lane) that are generated by the transmission signal processing unit 4. The sequence of the known signal is shared by the transmission unit 1 and the reception unit 3. The known signal has predetermined bits or symbols, and for example, is configured of a signal sequence having about 2000 symbols. A length of the sequence of the known signal is desired to be at least longer than a length of a FIR filter to be calculated.

The transmission signal processing unit 4 generates frame data based on transmission data sequence. The frame data is a signal sequence (modulation target signal sequence) subjected to modulation processing in the optical transmitter 7. The transmission signal processing unit 4 transmits the frame data into which the known signal sequence has been inserted, to the transmitter compensation unit 6.

The transmitter compensation unit 6 acquires an estimation result of a transfer function of the optical transmitter 7 from a transmitter transfer function estimation unit 8 of the reception unit 3 described below. The transmitter compensation unit 6 compensates the transfer function of each of the XI lane, the XQ lane, the YI lane, and the YQ lane of the optical transmitter 7 and difference of the transfer function among the lanes, based on the estimation result. The transmitter compensation unit 6 can be configured of a digital filter such as an FIR (Finite Impulse Response) filter; however, may be configured of an analog filter or the like. Further, the transmitter compensation unit 6 may include a function unit that has a function to individually compensate a delay time difference among the four lanes.

The optical transmitter 7 modulates linear-polarized light orthogonal to each other by the compensated frame data, to generate an optical signal of the modulation target signal sequence. The optical transmitter 7 includes a driver amplifier 7a, a laser module 7b (signal LD), a 90-degree synthesizer 7c, and a polarization synthesizer 7d. The driver amplifier 7a amplifies an electric signal of the compensated frame data so as to have an appropriate amplitude, and transmits the amplified electric signal to the 90-degree synthesizer 7c. The 90-degree synthesizer 7c is a Mach-Zehnder vector modulator that separates linear-polarized CW (Continuous Wave) light transmitted from the laser module 7b into linear polarized light orthogonal to each other, and modulates the linear polarized light with the frame data, thereby generating the optical signals of the modulation target signal sequence. The optical signal by the horizontally polarized wave and the optical signal by the vertically polarized wave are synthesized by the polarization synthesizer 7d, and the synthesized signal is supplied to the reception unit 3 through the transmission line 2.

The reception unit 3 includes an optical receiver 9, a data buffer 10, a receiver compensation unit 11, a reception signal processing unit 12, first and second receiver transfer function estimation units 13 and 14, and the transmitter transfer function estimation unit 8. The first and second receiver transfer function estimation units 13 and 14 and the transmitter transfer function estimation unit 8 configure the optical transmission characteristic estimation system that estimates optical transmission characteristics of the optical transceiver. The optical transmission characteristic estimation system, the transmitter compensation unit 6, and the receiver compensation unit 11 configure the optical transmission characteristic compensation system that compensates the optical transmission characteristics of the optical transceiver. Note that, in FIG. 1, the transmitter compensation unit 6 and the receiver compensation unit 11 are each illustrated as an individual block; however, the transmitter compensation unit 6 may be a part of the transmission signal processing unit 4, and the receiver compensation unit 11 may be a part of the reception signal processing unit 12.

The optical receiver 9 includes a polarization separator 9a, a laser module 9b (local oscillation LD), a polarization diversity 90-degree hybrid 9c, a photo diode (PD, not illustrated), a TIA (Transimpedance Amplifier) 9d, and an A/D converter 9e.

The laser module 9b transmits the linear polarized CW light to the polarization diversity 90-degree hybrid 9c. The polarization diversity 90-degree hybrid 9c causes interference of the received optical signal and the CW light. The photodiode photoelectrically converts the resultant optical signal. The TIA 9d converts a current signal to a voltage signal. The A/D converter 9e performs A/D conversion of the voltage signal. As a result, the received optical signal is converted into a baseband digital signal.

A part or all of the A/D converter 9e of the optical receiver 9, the data buffer 10, the receiver compensation unit 11, the reception signal processing unit 12, the first and second receiver transfer function estimation units 13 and 14, and the transmitter transfer function estimation unit 8 are configured of hardware such as an ASIC and an FPGA. Further, a part or all of the units may be configured of software that functions when a processor such as a CPU executes a program stored in a storage unit. Further, the first and second receiver transfer function estimation units 13 and 14 and the transmitter transfer function estimation unit 8 may be configured of an external apparatus independent of the optical transceiver, for example, a PC or an apparatus equivalent thereto. Moreover, the reception signal processing unit 12 may also have a function similar to the function of each of the first and second receiver transfer function estimation units 13 and 14 and the transmitter transfer function estimation unit 8, and may be shared therebetween.

The data buffer 10 is generally configured of a memory circuit (RAM), and temporarily stores the data as a result of the A/D conversion of the received signal by the optical receiver 9. The data stored in the data buffer 10 is sequentially transmitted to the receiver compensation unit 11 and the reception signal processing unit 12 on the post-stage. The first and second receiver transfer function estimation units 13 and 14 and the transmitter transfer function estimation unit 8 may acquire the data. Note that the first and second receiver transfer function estimation units 13 and 14 and the transmitter transfer function estimation unit 8 may directly acquire the A/D converted data in real time without using the data buffer 10. In the following, all of examples described with use of the digital data of the data buffer 10 include the method of directly acquiring the reception data in real time.

The receiver compensation unit 11 acquires the estimation result of the transfer function of the optical receiver 9 from the second receiver transfer function estimation unit 14, and compensates the transfer functions of the XI lane, the XQ lane, the YI lane, and the YQ lane of the optical receiver 9 and the difference of the transfer function among the lanes, based on the estimation result. The receiver compensation unit 11 is configured of a digital filter such as an FIR filter. Further, the receiver compensation unit 11 may include a function unit that has a function to individually compensate the delay time difference among the four lanes.

A digital signal is provided to the reception signal processing unit 12 from the receiver compensation unit 11. In the transmission line 2, waveform distortion occurs on the optical signal due to, for example, chromatic dispersion, polarization mode dispersion, polarization fluctuation, or nonlinear optical effect. The reception signal processing unit 12 compensates the waveform distortion occurred in the transmission line 2. The reception signal processing unit 12 also compensates difference between a frequency of the light from the laser module 7b of the optical transmitter 7 and a frequency of local oscillation light from the laser module 9b of the optical receiver 9. Further, the reception signal processing unit 12 compensates phase noise based on a line width of the light from the laser module 7b of the optical transmitter 7 and the line width of the local oscillation light from the laser module 9b of the optical receiver 9.

The first receiver transfer function estimation unit 13 estimates a temporary transfer function or a temporary inverse transfer function of the optical receiver 9 from the digital data that has been acquired by the reception unit 3 when an ASE (Amplified Spontaneous Emission) signal corresponding to white noise is input to an input end of the optical receiver 9. The ASE signal can be generated from an optical amplifier. In a case where only the ASE signal is output, the optical amplifier is used without any input. The optical amplifier may be separately prepared, or the optical amplifier of the transmission line 2 may be used. A spectrum (frequency characteristics) of the ASE signal is uniform. Therefore, the frequency characteristics of the optical receiver 9 are acquired through the input of the ASE signal. Accordingly, the first receiver transfer function estimation unit 13 acquires the data stored in the data buffer 10 while the ASE signal is input, which makes it possible to estimate the frequency characteristics. The frequency characteristics can be estimated for each lane. A configuration example of the first receiver transfer function estimation unit 13 is described below.

The frequency characteristics are estimated as a transfer function by performing Fourier transform on the digital data. Examples of a method of determining the inverse transfer function include a method of determining a solution of an adaptive filter, in addition to calculation of an inverse. Examples of the method of determining the solution of the adaptive filter generally include a method of determining a Wiener solution and a method by LMS (least mean square) algorithm, RLS (recursive least square) algorithm, etc. In this case, the transfer function is not relatively changed with time. Therefore, "adaption" does not mean temporal adaption. In the following, "adaption" indicates adaption to a feedback circuit to determine a convergent solution. A detailed configuration example of the first receiver transfer function estimation unit 13 is described below. Although the ASE signal is used in the above description, the signal is not limited to the ASE signal, and any test signal can be used as long as the spectrum of the signal is known.

The transmitter transfer function estimation unit 8 estimates the transfer function or the inverse transfer function of the optical transmitter 7 from first digital data that has been acquired by the reception unit 3 when a first known signal is transmitted from the transmission unit 1 to the reception unit 3, and the temporary transfer function or the temporary inverse transfer function of the optical receiver 9 of the reception unit 3. As the estimation method, for example, the transfer function of the optical transmitter 7 is estimated with use of an adaptive filter. The adaptive filter is, for example, a filter based on the LMS algorithm or a filter based on the RMS algorithm.

The second receiver transfer function estimation unit 14 estimates a true transfer function or a true inverse transfer function of the optical receiver 9 from second digital data that has been acquired by the reception unit 3 when a second known signal is transmitted from the transmission unit 1 to the reception unit 3, and the estimated transfer function or the estimated inverse transfer function of the optical transmitter 7. As the estimation method, for example, the inverse transfer function of the optical receiver 9 is estimated with use of an adaptive filter. The adaptive filter is, for example, a filter based on the LMS algorithm or a filter based on the RMS algorithm. Also in this case, the estimation can be performed for each lane.

Figure 2:
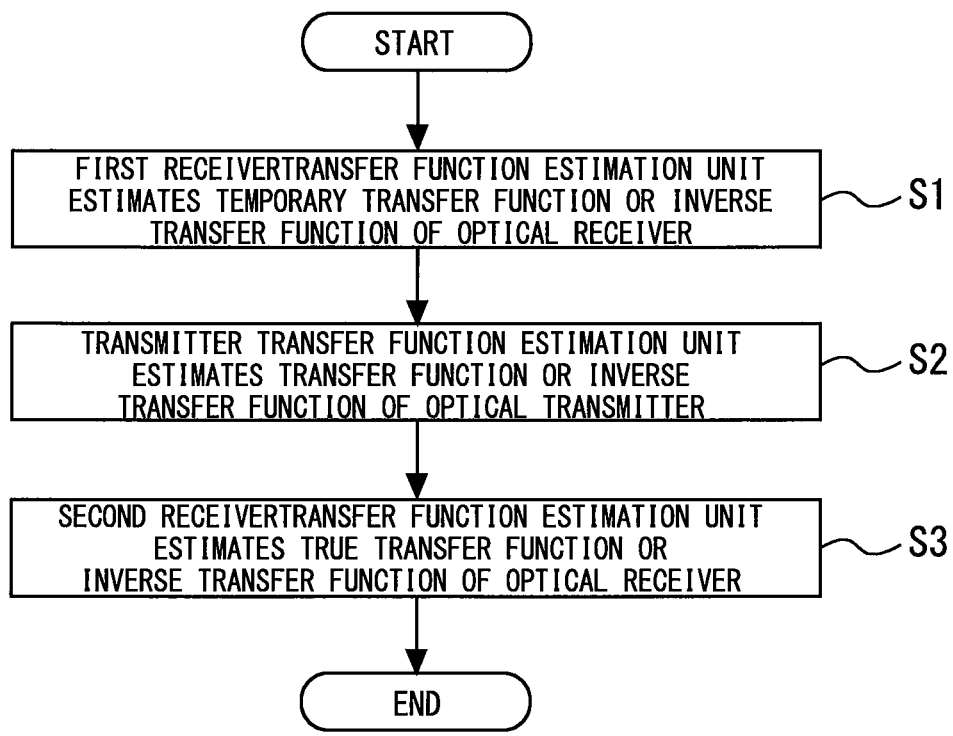
FIG. 2 is a flowchart illustrating the optical transmission characteristic estimation method according to the embodiment of the present invention.

Subsequently, a method of estimating the optical transmission characteristics of the optical transceiver by the optical transmission characteristic estimation system according to the present embodiment is described with reference to drawings. FIG. 2 is a flowchart illustrating the optical transmission characteristic estimation method according to the embodiment of the present invention. First, the first receiver transfer function estimation unit 13 estimates the temporary transfer function or the temporary inverse transfer function of the optical receiver 9 (step S1). Next, the transmitter transfer function estimation unit 8 estimates the transfer function or the inverse transfer function of the optical transmitter 7 (step S2). Next, the second receiver transfer function estimation unit 14 estimates the true transfer function or the true inverse transfer function of the optical receiver 9 (step S3).

Figure 3:
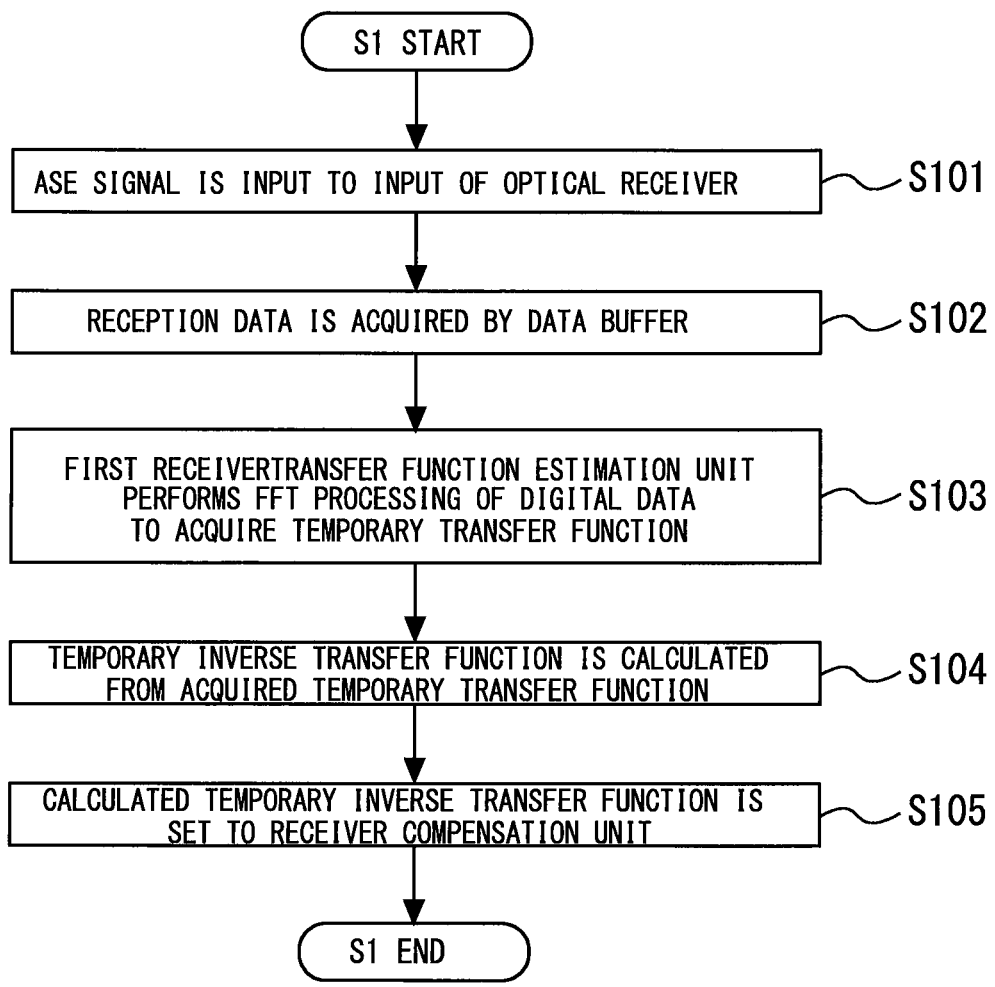
FIG. 3 is a flowchart to estimate the temporary transfer function of the optical receiver according to the embodiment of the present invention.

Next, detailed operation of each step is described. FIG. 3 is a flowchart to estimate the temporary transfer function of the optical receiver according to the embodiment of the present invention. First, the ASE signal is inserted into the input of the optical receiver 9 (step S101). Since the uniform spectrum of the ASE signal is known, the frequency characteristics can be acquired through insertion of the ASE signal. Next, the data buffer 10 acquires the reception data while the ASE signal is input (step S102). Next, the first receiver transfer function estimation unit 13 acquires the digital data from the data buffer 10 and performs the FFT processing, thereby acquiring the temporary transfer function (step S103). Next, the temporary inverse transfer function is calculated from the acquired temporary transfer function (step S104). Next, the calculated temporary inverse transfer function is set to the receiver compensation unit 11 (step S105).

Figure 4:
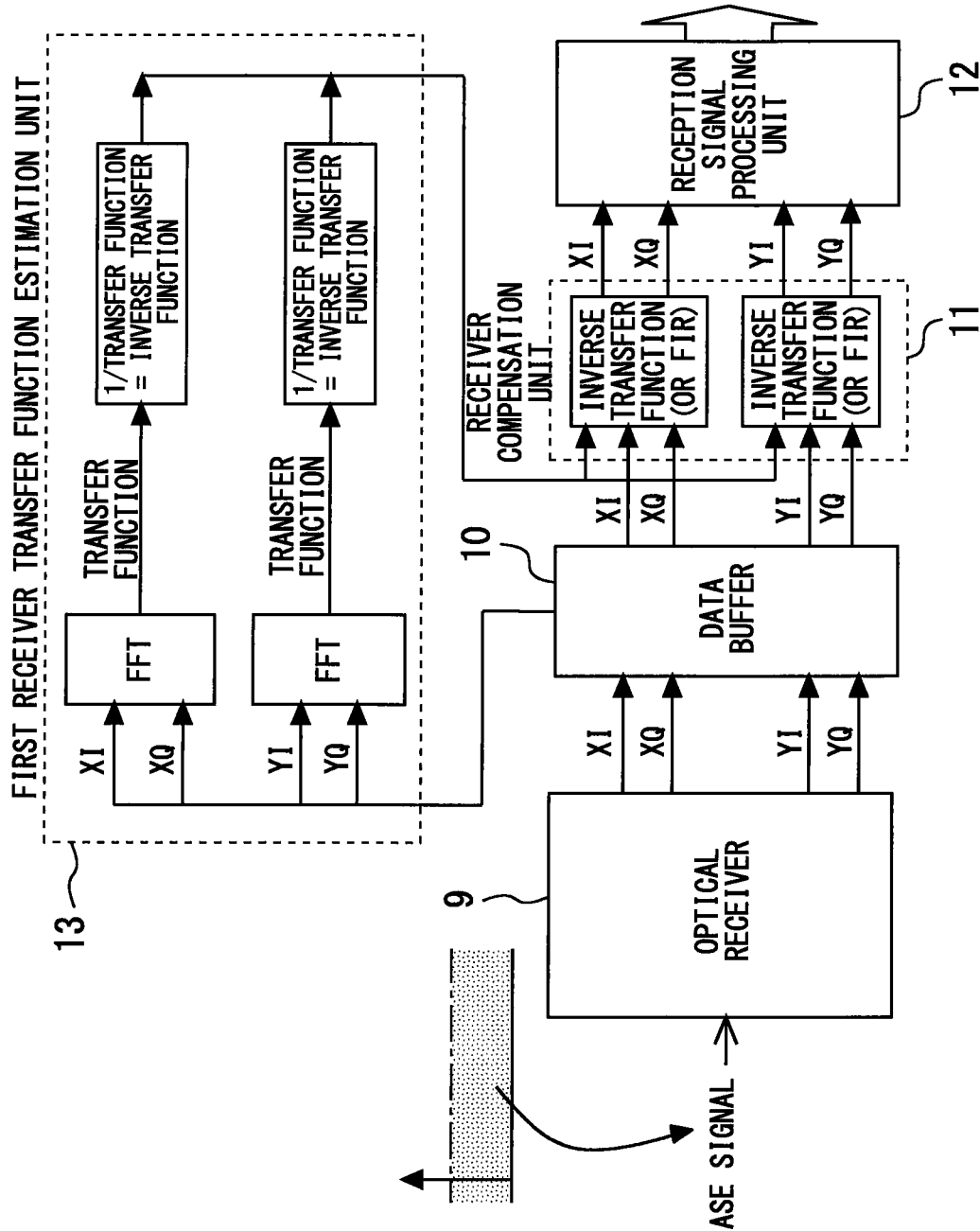
FIG. 4 is a diagram illustrating a first receiver transfer function estimation unit according to an embodiment 1 of the present invention.

FIG. 4 is a diagram illustrating a first receiver transfer function estimation unit according to an embodiment 1 of the present invention. The first receiver transfer function estimation unit 13 includes an FFT (fast Fourier transform) that performs FFT processing on each of the reception signal of the X-polarized wave and the reception signal of the Y-polarized wave, and circuits that perform 1/transfer function processing on the respective outputs to calculate the inverse transfer functions. Note that the reception signal of the X-polarized wave is expressed by XI+jXQ, and the reception signal of the Y-polarized wave is expressed by YI+jYQ, and a case where there is no delay difference between the lanes XI and XQ and between the lanes YI and YQ is assumed. In a case where there is delay difference, the Fourier transform and 1/transfer function processing can be individually performed on the lanes XI, XQ, YI, and YQ. Note that the processing is not necessarily limited to the FFT processing and the other method can be used as long as the Fourier transform can be performed. In the following, "FFT" indicates the function of the Fourier transform.

The digital data acquired by the data buffer 10 is data in a time domain. Therefore, the data is converted into data in a frequency domain by the FFT processing in each of the lanes of the X-polarized wave and the lanes of the Y-polarized wave.

[Math. 1]
$$X_R(k) = FFT[x_R(n)] = \sum_{n=0}^{N-1} x_R(n) e^{-j\frac{2\pi}{N}nk}$$

where $X_R(n)$ is the digital data acquired by the data buffer 10, and $X_R(k)$ is the FFT-processed data. The FFT indicates fast processing of DFT (Discrete Fourier Transform). Although the common FFT processing with respect to a continuous signal is performed for each finite N pieces of data, it goes without saying that the data is processed while being overlappingly processed by the adjacent processing (there are overlap-Add method, overlap-Save method, and the like). This is true of the following FFT processing. An absolute value of the FFT-processed data $X_R(k)$ indicates amplitude information, and is acquired as the temporary transfer function. The temporary inverse transfer function can be acquired through calculation of an inverse of the temporary transfer function. The inverse transfer function can be set to the receiver compensation unit 11. Further, the inverse transfer function is also used for estimation of the transfer function of the optical transmitter 7. In this case, the inverse transfer function of the temporary transfer function is not necessarily set to the receiver compensation unit 11.

Figure 5:
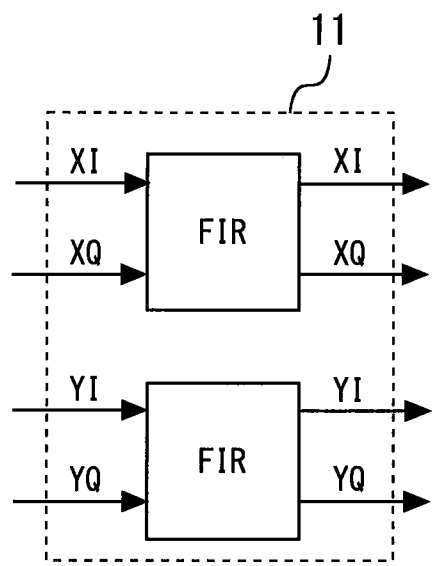
FIG. 5 is a diagram illustrating a receiver compensation unit according to the embodiment 1 of the present invention.

FIG. 5 is a diagram illustrating a receiver compensation unit according to the embodiment 1 of the present invention. The receiver compensation unit 11 performs IQ vector processing (time domain processing). In other words, the X-polarized wave and the Y-polarized wave are respectively expressed by complex vector signals XI+jXQ and YI+jYQ, and the transmission characteristics are compensated by the FIR filter. The inverse transfer function calculated in step S104 is converted into a time response signal by not-illustrated IFFT processing, and the resultant signal is set as a filter coefficients of the FIR filter.

Figure 6:
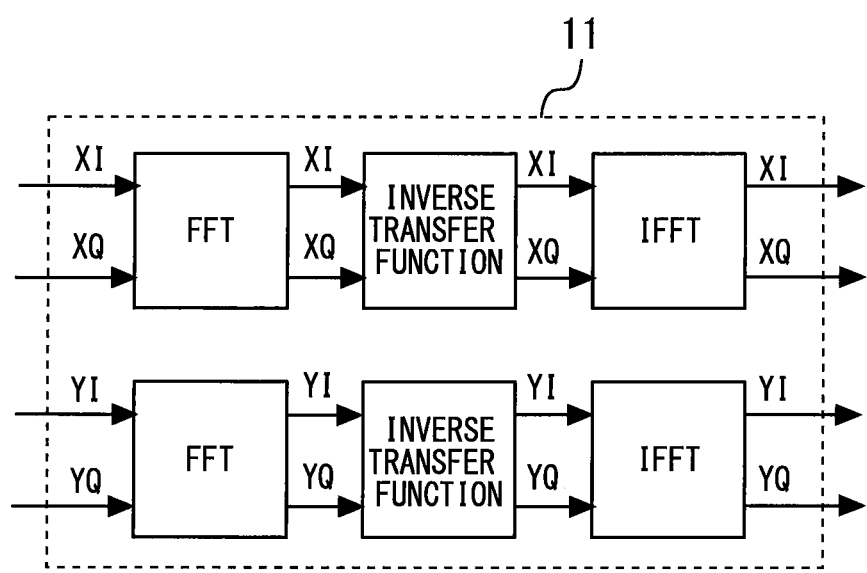
FIG. 6 is a diagram illustrating a receiver compensation unit according to an embodiment 2 of the present invention.

FIG. 6 is a diagram illustrating a receiver compensation unit according to an embodiment 2 of the present invention. The receiver compensation unit 11 performs IQ vector processing (frequency domain processing). In other words, the X-polarized wave and the Y-polarized wave are respectively expressed by complex vector signals XI+jXQ and YI+jYQ, are each converted into a signal in the frequency domain by the FFT processing once, and the resultant signal is multiplied by the inverse transfer function calculated in step S104 to compensate the transmission characteristics. Thereafter, the resultant signal is returned to the signal in the time domain by the IFFT processing.

Figure 7:
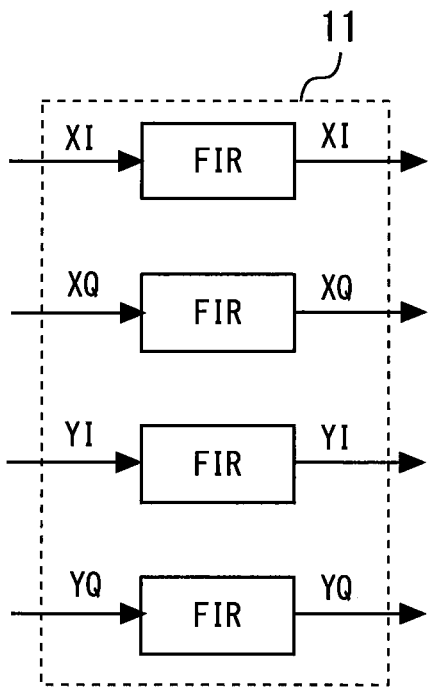
FIG. 7 is a diagram illustrating a receiver compensation unit according to an embodiment 3 of the present invention.

FIG. 7 is a diagram illustrating a receiver compensation unit according to an embodiment 3 of the present invention. The receiver compensation unit 11 performs IQ individual processing (time domain processing). In other words, the transmission characteristics of XI and XQ of the X-polarized wave and the transmission characteristics of YI and YQ of the Y-polarized wave are compensated by respective FIR filters. In this case, filter coefficients of each of the FIR filters can be determined by individually performing the processing of the first receiver transfer function estimation unit 13 in FIG. 4 and further performing not-illustrated IFFT processing on XI, XQ, YI, and YQ in steps S103 to S105.

Figure 8:
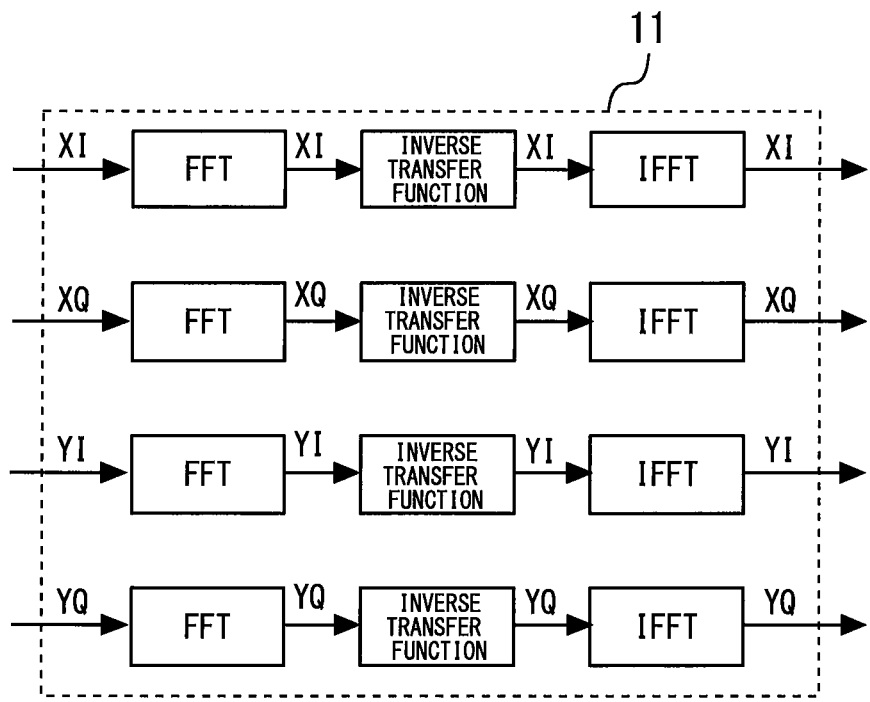
FIG. 8 is a diagram illustrating a receiver compensation unit according to an embodiment 4 of the present invention.

FIG. 8 is a diagram illustrating a receiver compensation unit according to an embodiment 4 of the present invention. The receiver compensation unit 11 performs IQ individual processing (frequency domain processing). In other words, XI and XQ of the X-polarized wave and YI and YQ of the Y-polarized wave are each converted into a signal in the frequency domain by the FFT processing once, and the resultant signal is multiplied by the inverse transfer function calculated in step S104 to compensate the transmission characteristics. In this case, each of the inverse transfer functions can be performed by individually performing the processing of the first receiver transfer function estimation unit 13 in FIG. 4 on XI, XQ, YI, and YQ in previous steps S103 to S105. Thereafter, the resultant signal is returned to the signal in the time domain by the IFFT processing.

The receiver compensation unit 11 can include various configurations as described above, and may include any configuration without being limited to the above-described configurations as long as the receiver compensation unit 11 can compensate the transfer function. The compensation by the receiver compensation unit 11 in the frequency domain is expressed by the following expression. Note that it goes without saying that the transfer function can be compensated by IFFT with use of the FIR filter in the time domain.

[Math. 2]

$$\begin{bmatrix} X_{out} \\ Y_{out} \end{bmatrix} = \begin{bmatrix} H1 & H2 \\ H3 & H4 \end{bmatrix} \begin{bmatrix} X_{in} \\ Y_{in} \end{bmatrix}$$

$$\begin{bmatrix} XI_{out} \\ XQ_{out} \end{bmatrix} = \begin{bmatrix} H1 & H2 \\ H3 & H4 \end{bmatrix} \begin{bmatrix} XI_{in} \\ XQ_{in} \end{bmatrix} \begin{bmatrix} YI_{out} \\ YQ_{out} \end{bmatrix} = \begin{bmatrix} H5 & H6 \\ H7 & H8 \end{bmatrix} \begin{bmatrix} YI_{in} \\ YQ_{in} \end{bmatrix}$$

$$\begin{bmatrix} XI_{out} \\ XQ_{out} \\ YI_{out} \\ YQ_{out} \end{bmatrix} = \begin{bmatrix} H1 & H2 & H3 & H4 \\ H5 & H6 & H7 & H8 \\ H9 & H10 & H11 & H12 \\ H13 & H14 & H15 & H16 \end{bmatrix} \begin{bmatrix} XI_{in} \\ XQ_{in} \\ YI_{in} \\ YQ_{in} \end{bmatrix}$$

where $X_{out}$ and $Y_{out}$ are compensated data of $X_{in}$=XI+jXQ and $Y_{in}$=YI+jYQ, respectively, $XI_{out}$, $XQ_{out}$, $YI_{out}$, and $YQ_{out}$ are compensated data of $XI_{in}$, $XQ_{in}$, $YI_{in}$, and $YQ_{in}$, respectively, and H1 to H16 are inverse transfer functions in that case.

Although not illustrated, IQ vector processing and IQ individual processing may be combined. For example, as illustrated below, the filtering processing is performed on an IQ vector by a complex filter once, the IQ vector is then separated into a real part and an imaginary part, and filtering is performed on each of the real part and the imaginary part by a real-number filter.

X*complex filter→XI*real-number filter, XQ*real-number filter (filter coefficients are individually settable)

Y*complex filter→YI*real-number filter, YQ*real-number filter (filter coefficients are individually settable)

where X and Y each are expressed by a complex vector, XI, XQ, YI and YQ are each expressed by a real number, "*" indicates processing, and "→" indicates flow of the processing.

Further, the following configuration is also considered.

X, Y*complex filter (processed with same coefficients in time series)→XI*real-number filter, XQ*real-number filter, YI*real-number filter, YQ*real-number filter (filter coefficients are individually settable)

XI, XQ, YI, YQ*real-number filter (processed with same coefficients in time series)→XI*real-number filter, XQ*real-number filter, YI*real-number filter, YQ*real-number filter (filter coefficients are individually settable)

In a case where the filter coefficients corresponding to X and Y are not individually settable for each lane or a case where one filter is repeatedly used in order to reduce the circuit scale in implementation, the above-described configuration is considered. The memory, the selector circuit, or the like can be simplified by making the filter coefficients the same. This makes it possible to reduce the circuit scale.

Note that the circuit scale can be reduced when the complex filtering of the complex signal such as X and Y is collectively processed in the frequency domain (FFT→multiplication of transfer function→IFFT), as compared with individual processing. Further, processing of the real-number filtering in the time domain (FIR filter (convolution operation)) is efficient in circuit scale. The frequency characteristics and the delay difference can be compensated in the above-described manner.

Figure 9:
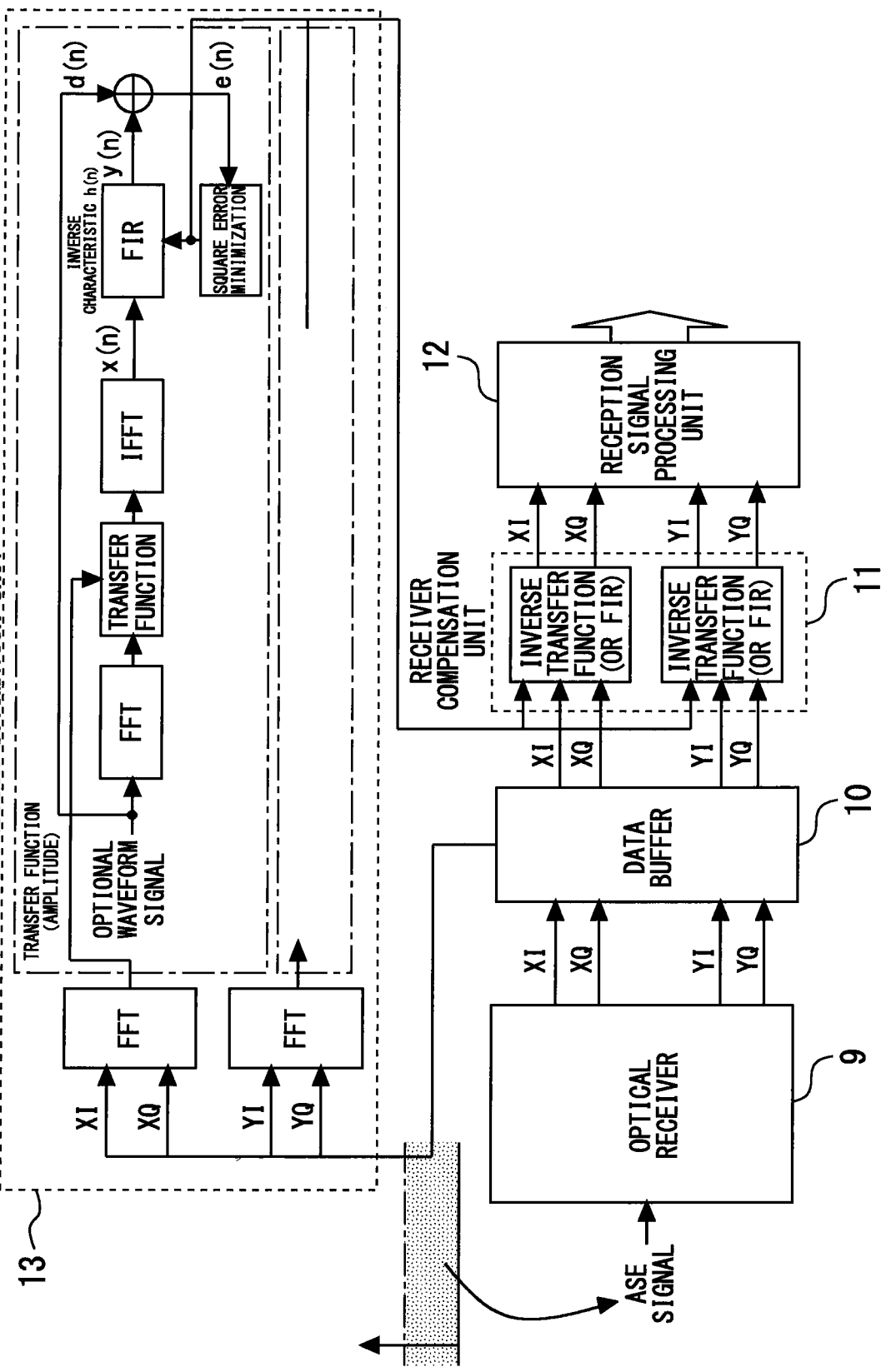
FIG. 9 is a diagram illustrating a first receiver transfer function estimation unit according to the embodiment 2 of the present invention.

FIG. 9 is a diagram illustrating a first receiver transfer function estimation unit according to the embodiment 2 of the present invention. The FFT processing of the digital data of the data buffer 10 and the processing to determine the transfer function of the amplification information are the same as the processing according to the embodiment 1 illustrated in FIG. 4; however, the method of determining the inverse transfer function is different in the present embodiment. The inverse transfer function is determined by a method called adaptive equalization using a common adaptive filter. In this case, an optional waveform signal is multiplied by the transfer function and the resultant signal is compensated by the inverse transfer function again such that a result thereof becomes the same as the initial optional waveform signal (actually, square error becomes minimum). The filter coefficients of the FIR filter configuring the adaptive filter can be determined as the time response of the inverse transfer function by this processing. The method of determining the inverse transfer function is generally known as Wiener solution or LMS (Least Mean Square) algorism described below.

$$e(n)=d(n)-y(n)=d(n)-h(n)^T x(n)$$

$$h(n)=[x(n)^T x(n)]^{-1} x(n)^T s(n) \text{ Wiener Solution}$$

$$h(n+1)=h(n)+\mu e(n)x(n) \text{ LMS} \quad [\text{Math. 3}]$$

where d(n) is the known signal, y(n) is an output of the adaptive filter, e(n) is difference between the known signal d(n) and the output y(n) of the adaptive filter, and h(n) is time response of the adaptive filter.

In the method of calculating the inverse transfer function from the inverse of the transfer function according to the embodiment 1, in a case where a frequency component of the transfer function is extremely small and close to zero, the inverse diverges to infinity, which causes unstable inverse characteristics. The method according to the present embodiment prevents such instability and can stably determine the inverse transfer function. On the other hand, in the method using the adaptive filter, divergence may occur or the solution becomes unstable in a case where the input signal becomes extremely small or a case where the input signal is out of the band and is extremely small. In such a case, the divergence and the unstable solution can be avoided through addition of minute noise to the input signal. Note that the noise may be added to the signal in calculation, or may be actually added to the signal in the transmission line. This is true of the following adaptive filter.

Figure 10:
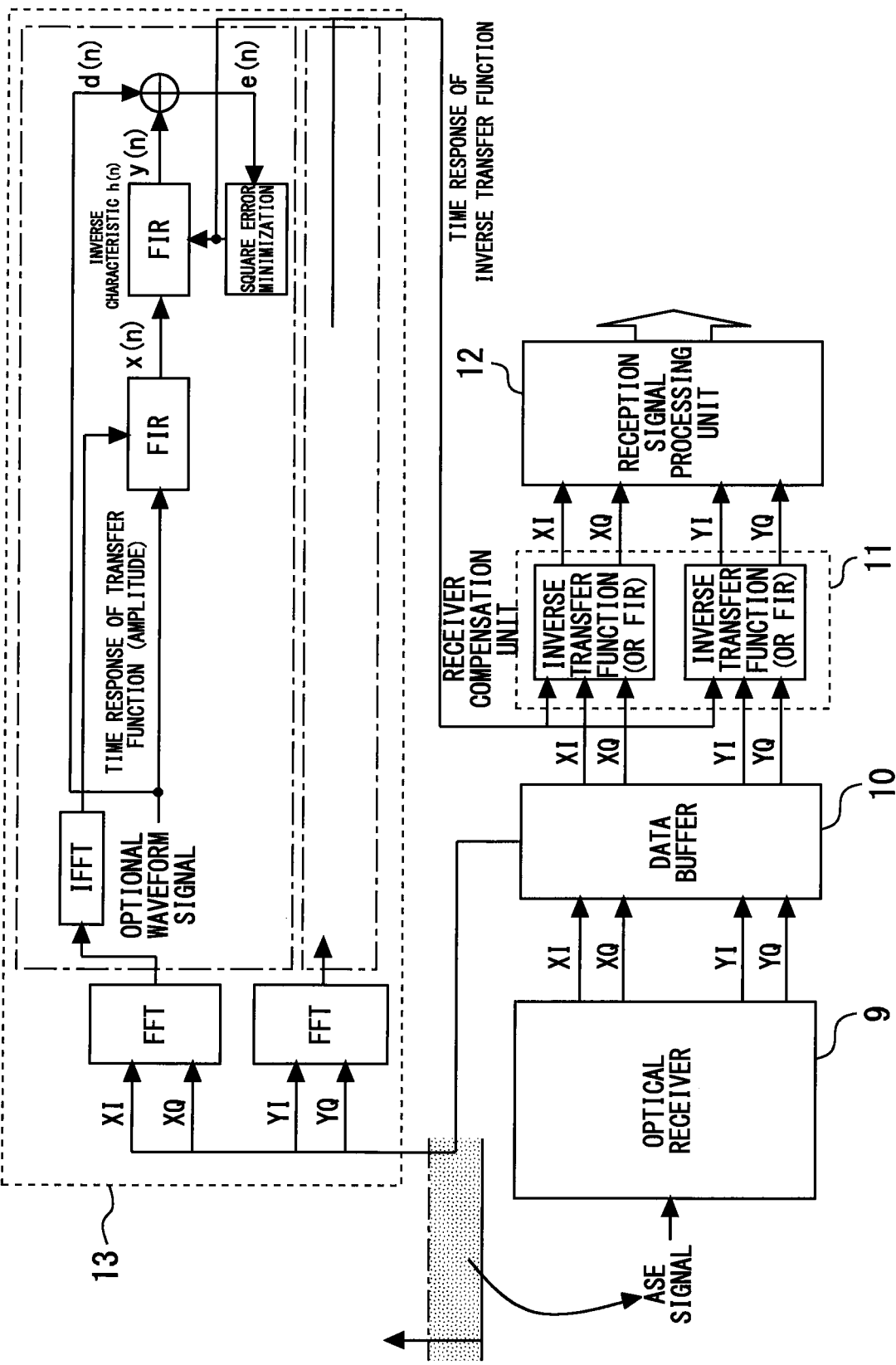
FIG. 10 is a diagram illustrating a first receiver transfer function estimation unit according to the embodiment 3 of the present invention.

FIG. 10 is a diagram illustrating a first receiver transfer function estimation unit according to the embodiment 3 of the present invention. In the present embodiment, the FIR filter processing is performed on the time response converted from the transfer function in place of multiplying the optional waveform signal by the transfer function according to the embodiment 2. The operation principle applying the transfer function is equivalent. The other circuits and the method of determining the inverse transfer function are the same as those according to the embodiment 2. Also in this case, the inverse transfer function can be stably determined as compared with the method of determining the inverse transfer function according to the embodiment 1.

Figure 11:
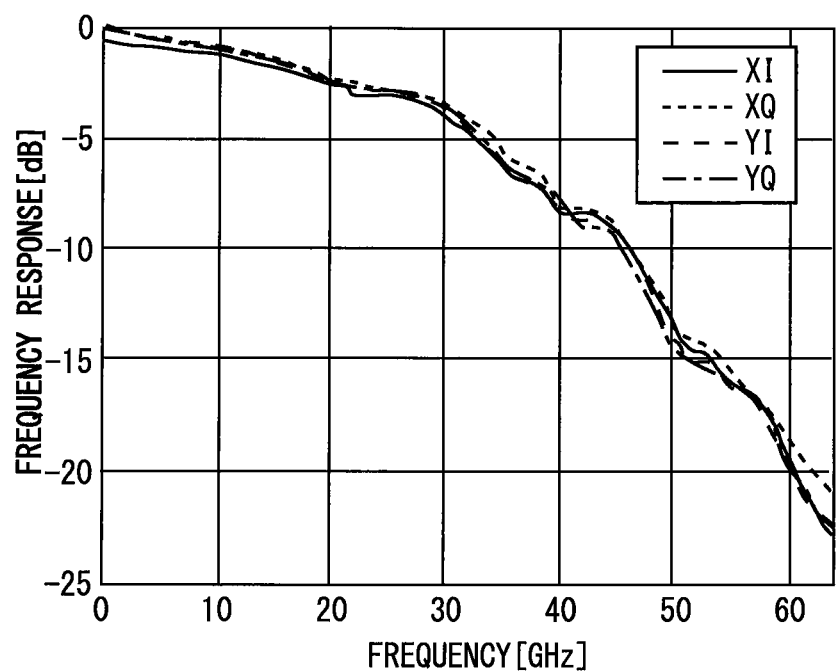
FIG. 11 is a diagram illustrating frequency response (amplitude information) of the temporary transfer function of the optical receiver according to the embodiment of the present invention.
Figure 12:
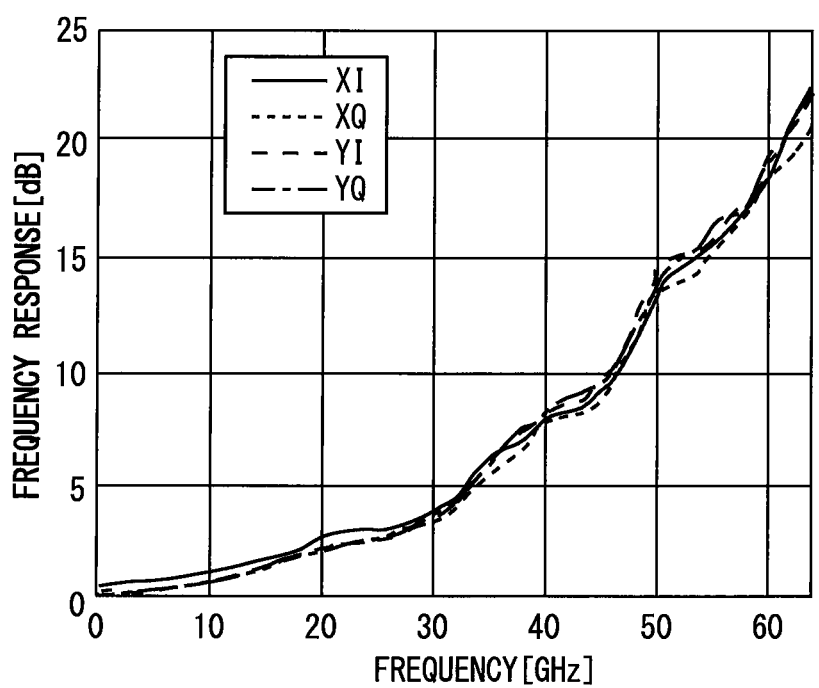
FIG. 12 is a diagram illustrating frequency response (amplitude information) of the temporary inverse transfer function of the optical receiver according to the embodiment of the present invention.

The temporary transfer function or the temporary inverse transfer function of the optical receiver 9 can be determined by the first receiver transfer function estimation unit 13 according to any of the embodiments 1 to 3 in the above-descried manner. FIG. 11 is a diagram illustrating frequency response (amplitude information) of the temporary transfer function of the optical receiver according to the embodiment of the present invention. FIG. 12 is a diagram illustrating frequency response (amplitude information) of the temporary inverse transfer function of the optical receiver according to the embodiment of the present invention. These are determined for each lane.

Figure 13:
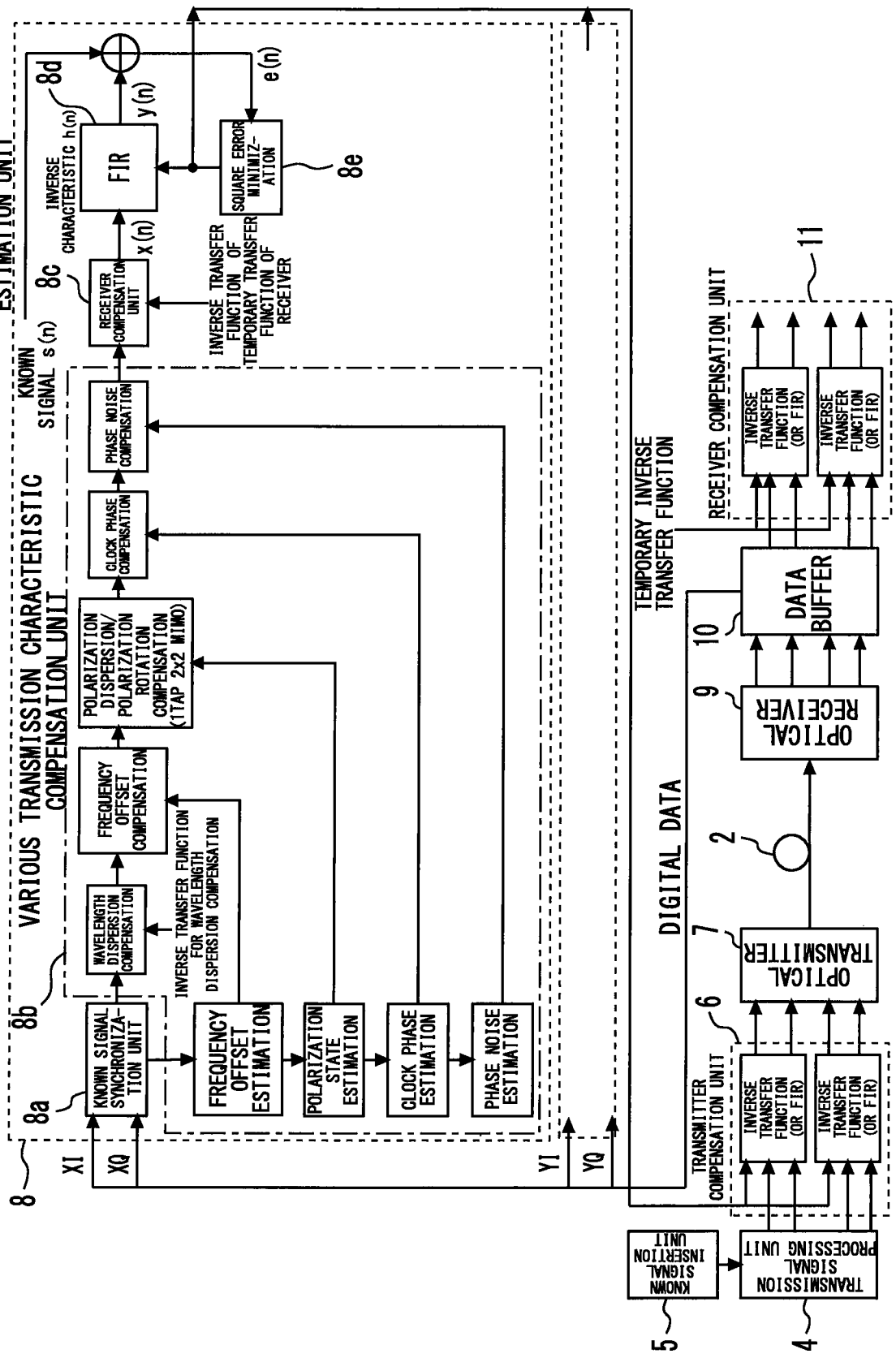
FIG. 13 is a diagram illustrating the transmitter transfer function estimation unit according to the embodiment of the present invention.

FIG. 13 is a diagram illustrating the transmitter transfer function estimation unit according to the embodiment of the present invention. The transmitter transfer function estimation unit 8 includes a known signal synchronization unit 8a, a various transmission characteristic compensation unit 8b, a receiver compensation unit 8c, and an adaptive filter that includes an FIR filter 8d and a square error minimization unit 8e. The various transmission characteristic compensation unit 8b includes various compensation circuits for compensation of distortion in transmission such as chromatic dispersion compensation, frequency offset compensation, polarization dispersion/polarization rotation compensation, clock phase compensation, and phase noise compensation. Note that the known signal synchronization unit 8a has a function to extract the known signal from the digital data, and estimates, by various kinds of estimation blocks, the compensation data to be set to the various transmission characteristic compensation unit on the post-stage, from the state of the extracted known signal. In other words, estimation of the transfer function or the inverse transfer function of the optical transmitter 7 includes processing to estimate the transmission characteristics of the transmission line 2. Note that the receiver compensation unit 8c may be disposed on the pre-stage of the various transmission characteristic compensation unit 8b.

A chromatic dispersion compensation unit may be disposed on the pre-stage of the known signal synchronization unit 8a. The order of compensation units in the various transmission characteristic compensation unit may be changed. Further, (1TAP 2×2 MIMO (Multi Input Multi Output)) of the polarization dispersion/polarization rotation compensation means that the number of taps of the filter is set to one, and only polarization rotation is performed without compensating band characteristics of the optical transceiver by the block (common 2×2 MIMO filter with plurality of taps compensates band characteristics).

Further, the transmitter transfer function estimation unit 8 processes each of the X-polarized wave and the Y-polarized wave as the complex vector signal as with the first receiver transfer function estimation unit 13 in FIG. 4; however, the transmitter transfer function estimation unit 8 can independently process each of the lanes XI, XQ, YI, and YQ. In this case, the delay difference among the lanes can be extracted and compensated. When the X-polarized wave is processed as the complex vector signal, the delay difference (Skew) between the lanes XI and XQ is regarded as zero. In the case where the delay difference is not ignorable, it is necessary to perform extraction and compensation of the transfer function for each lane. This is true of the Y-polarized wave.

Figure 14:
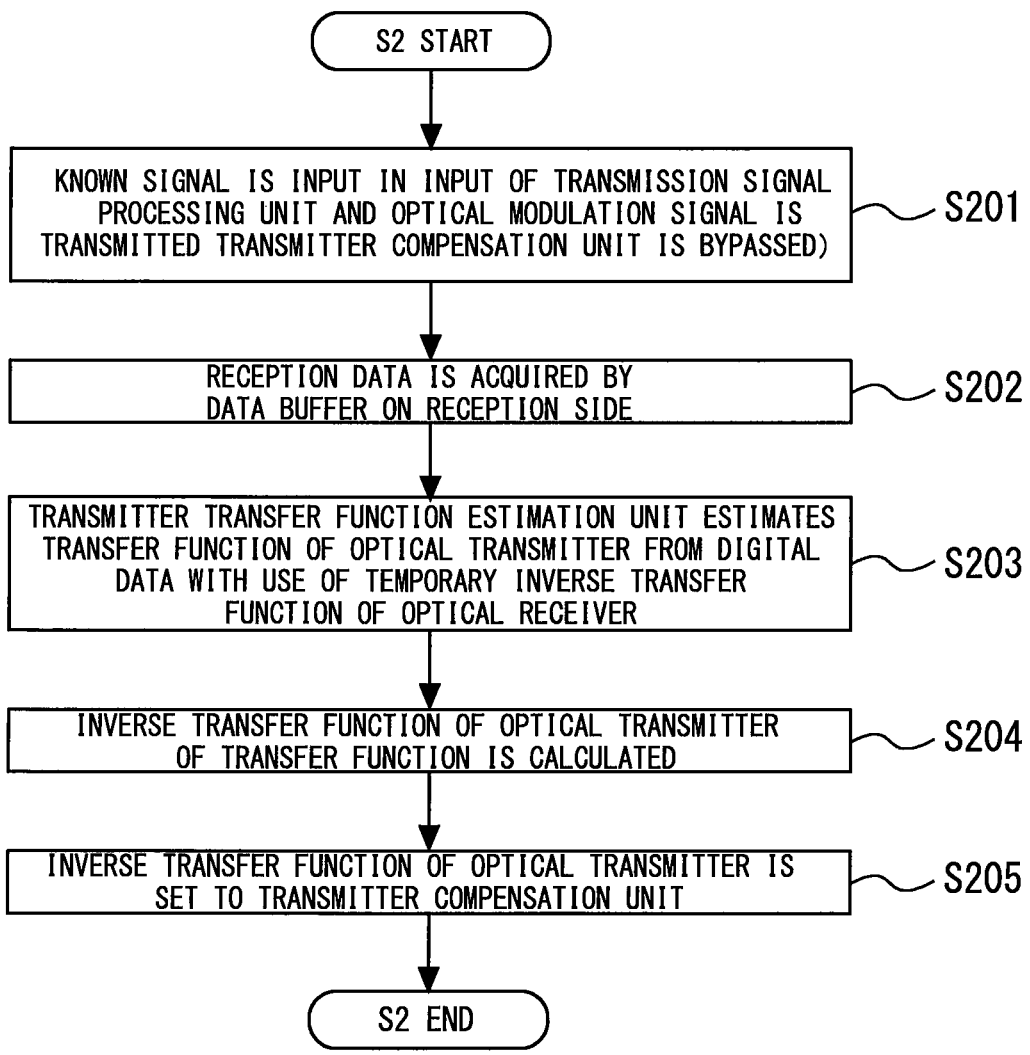
FIG. 14 is a flowchart to acquire the transfer function or the inverse transfer function of the optical transmitter according to the embodiment of the present invention.

FIG. 14 is a flowchart to acquire the transfer function or the inverse transfer function of the optical transmitter according to the embodiment of the present invention. First, the known signal is input to an input of the transmission signal processing unit 4, and an optical modulation signal is transmitted from the optical transmitter 7 (step S201). At this time, the transmitter compensation unit 6 is bypassed. Note that the transmitter compensation unit 6 can include the configuration same as the configuration of the receiver compensation unit 11 illustrated in FIGS. 5 to 8. Next, the reception data is acquired by the data buffer 10 on the reception side (step S202). Next, the transmitter transfer function estimation unit 8 acquires the digital data from the data buffer 10 (step S203). The known signal synchronization unit 8a extracts the known signal from the acquired digital data. The various transmission characteristic compensation and the optical receiver compensation are performed on the extracted known signal. The optical receiver compensation is performed with use of the temporary inverse transfer function of the optical receiver 9 estimated in step S1. Although FIG. 13 illustrates the configuration in which the receiver compensation unit 11 on the post-stage of the data buffer 10 performs compensation with use of the temporary inverse transfer function, the compensation is not particularly necessary for the above-described processing of the transmitter transfer function estimation unit 8.

The known signal that has been subjected to the various transmission characteristic compensation and the optical receiver compensation still includes influence of the transfer function of the optical transmitter 7. Accordingly, the FIR filter 8d set with the inverse characteristics thereof is applied as the adaptive filter to the signal to correct the inverse characteristics again so as to minimize a square of difference between the output and the known signal. The filter coefficients of the FIR filter 8d configuring the adaptive filter can be determined as the time response of the inverse transfer function through the processing. The method of determining the inverse transfer function is generally known as Wiener solution or the LMS algorithm described below.

$$e(n)=s(n)-y(n)=s(n)-h(n)^T x(n)$$

$$h(n)=[x(n)^T x(n)]^{-1} x(n)^T s(n) \text{ Wiener Solution}$$

$$h(n+1)=h(n)+\mu e(n)x(n) \text{ LMS} \quad \text{[Math. 4]}$$

where s(n) is the known signal, y(n) is the output of the adaptive filter, e(n) is the difference between the known signal s(n) and the output y(n) of the adaptive filter, and h(n) is the time response of the adaptive filter.

In the above-described example, the inverse transfer function of the optical transmitter 7 can be directly determined by the adaptive equalization circuit. Therefore, step S203 and step S204 can be integrally processed. In contrast, in the case where the transfer function of the optical transmitter 7 is determined once, the inverse transfer function is calculated (step S204).

Next, the estimated inverse transfer function of the optical transmitter 7 is set to the transmitter compensation unit 6 (step S205). The setting method is the same as the method described in step S105. At this time, as described above, each of the lanes XI, XQ, YI, and YQ can be independently processed. In this case, the delay difference among the lanes can be extracted and compensated.

Figure 15:
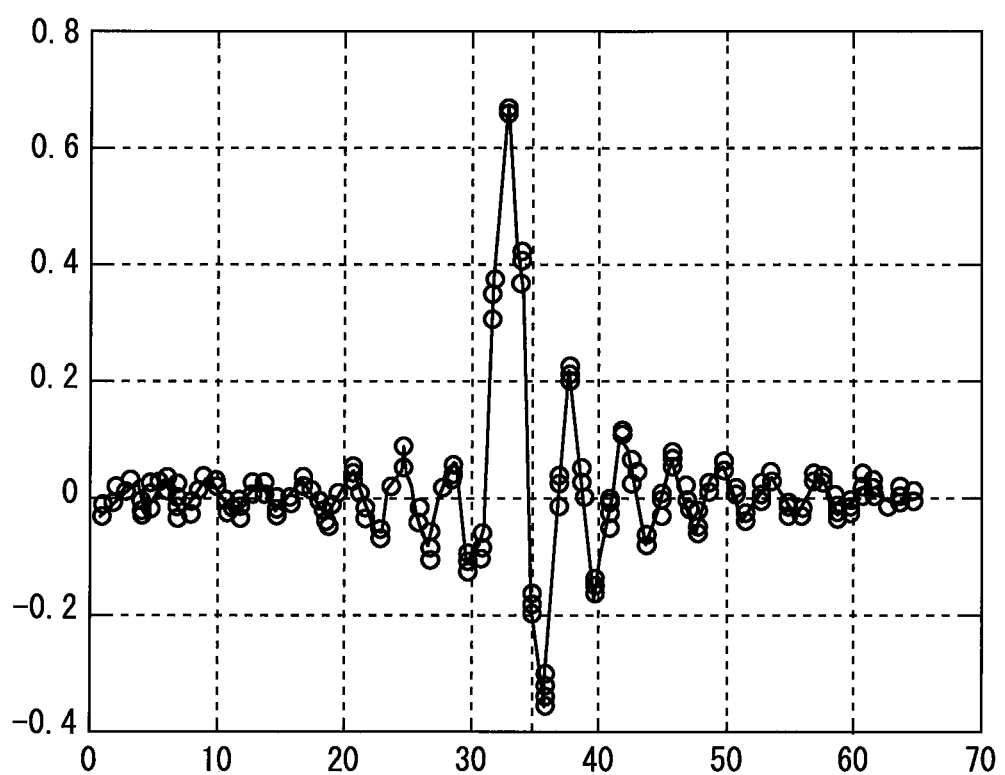
FIG. 15 is a diagram illustrating the time response of the inverse transfer function of the optical transmitter determined by the transmitter transfer function estimation unit.
Figure 16:
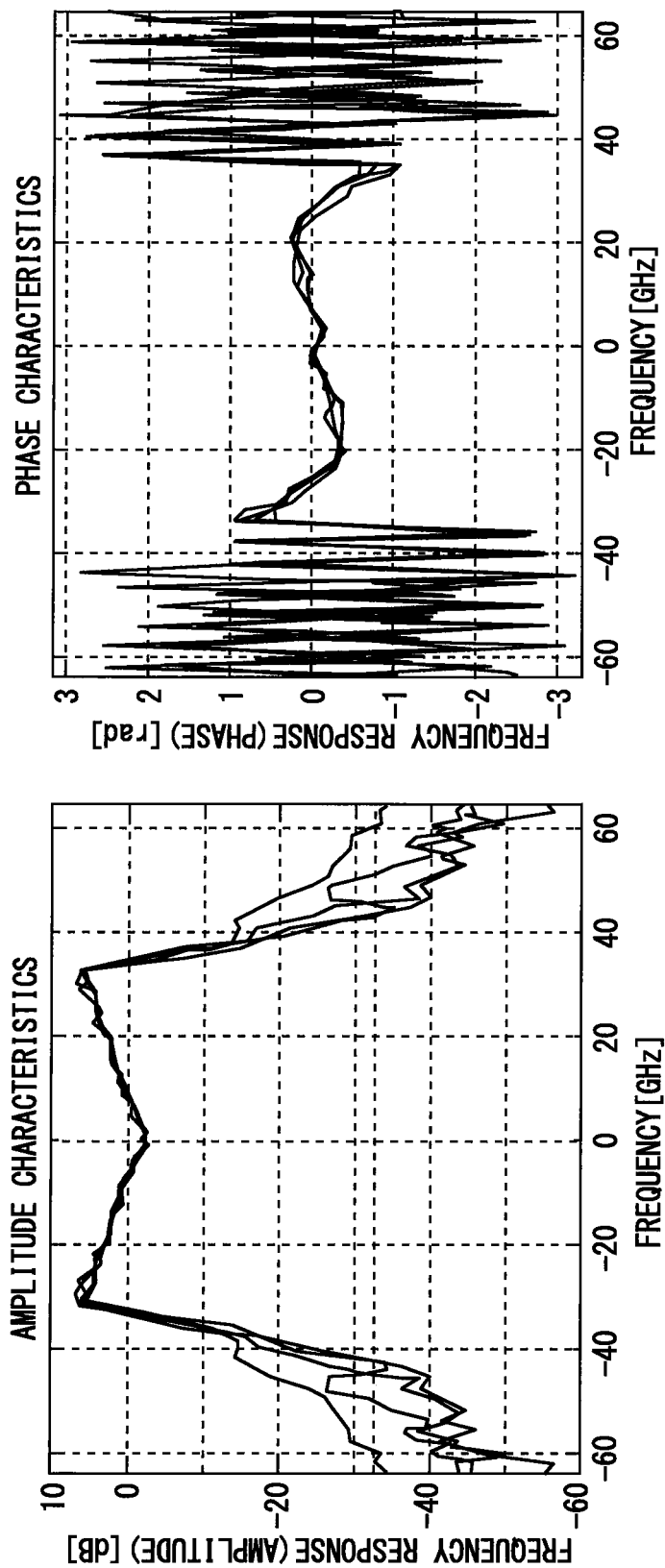
FIG. 16 is a diagram illustrating the frequency response (amplitude characteristics and phase characteristics) of the inverse transfer function of the optical transmitter determined by the transmitter transfer function estimation unit.

The transfer function or the inverse transfer function of the optical transmitter 7 can be determined by the transmitter transfer function estimation unit 8 in the above-described manner. FIG. 15 is a diagram illustrating the time response of the inverse transfer function of the optical transmitter determined by the transmitter transfer function estimation unit. FIG. 16 is a diagram illustrating the frequency response (amplitude characteristics and phase characteristics) of the inverse transfer function of the optical transmitter determined by the transmitter transfer function estimation unit.

Figure 17:
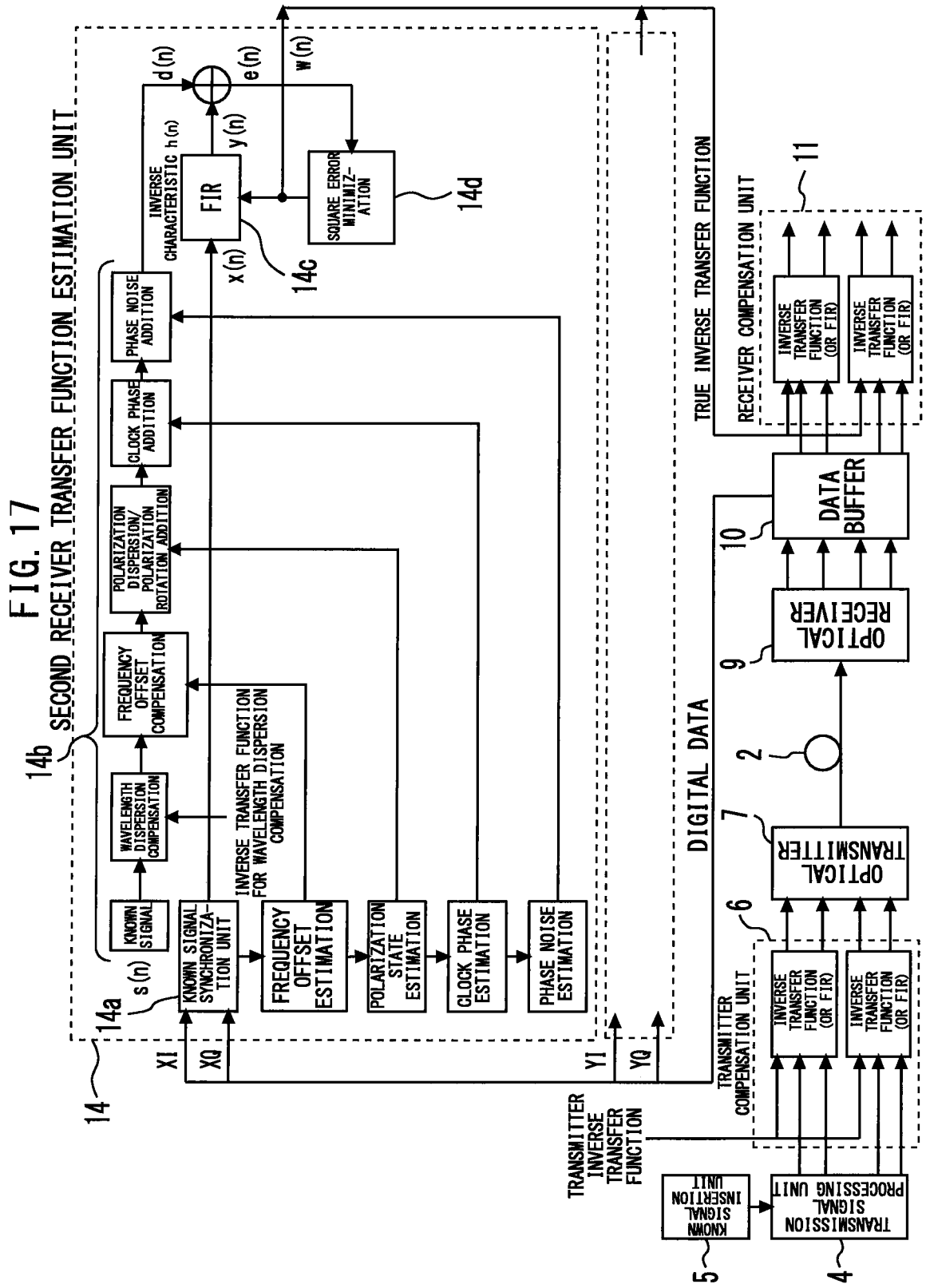
FIG. 17 is a diagram illustrating a second receiver transfer function estimation unit according to the embodiment 1 of the present invention.

FIG. 17 is a diagram illustrating a second receiver transfer function estimation unit according to the embodiment 1 of the present invention. The second receiver transfer function estimation unit 14 includes a known signal synchronization unit 14a, a circuit 14b that simulates distortion in transmission for chromatic dispersion compensation, frequency offset compensation, polarization dispersion/polarization rotation addition, clock phase addition, phase noise addition, and the like, an FIR filter 14c for adaptive equalization, and a square error minimization circuit 14d. The known signal synchronization unit 14a has a function to extract the known signal from the digital data, and estimates, by various kinds of estimation blocks, addition data to be set to the circuit that simulates the distortion on the post-stage from the state of the extracted known signal. In other words, estimation of the transfer function or the inverse transfer function of the optical receiver 9 includes processing to estimate the transmission characteristics of the transmission line 2. Note that the order of the units in the circuit 14b that simulates distortion in transmission for chromatic dispersion compensation, frequency offset compensation, polarization dispersion/polarization rotation addition, clock phase addition, phase noise addition, and the like may be changed.

The second receiver transfer function estimation unit 14 processes each of the X-polarized wave and the Y-polarized wave as the complex vector signal as with the first receiver transfer function estimation unit 13 in FIG. 14; however, the second receiver transfer function estimation unit 14 can independently process each of the lanes XI, XQ, YI, and YQ. In this case, the delay difference among the lanes can be extracted and compensated. When the X-polarized wave is processed as the complex vector signal, the delay difference between the lanes XI and XQ is regarded as zero. In the case where the delay difference is not ignorable, it is necessary to perform extraction and compensation of the transfer function for each lane. This is true of the Y-polarized wave.

Figure 18:
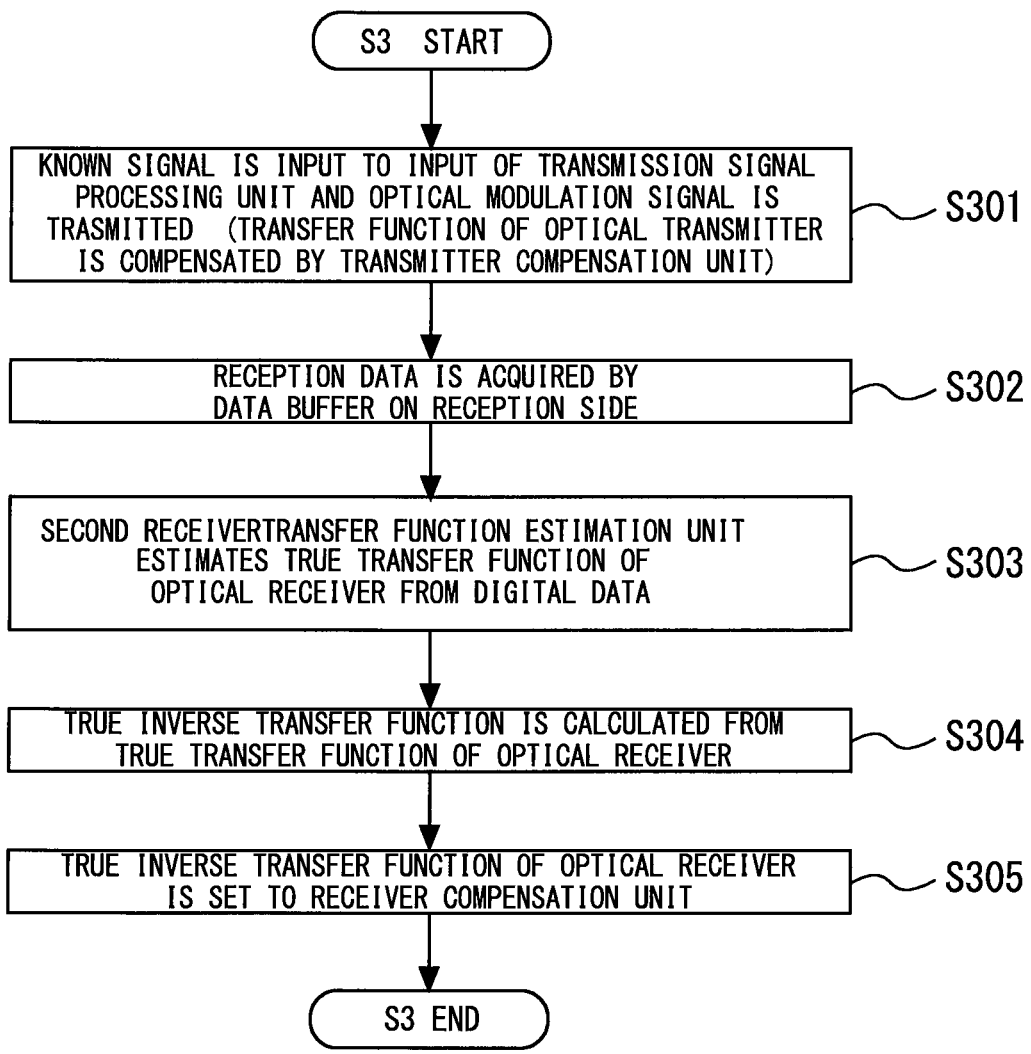
FIG. 18 is a flowchart to estimate the true transfer function or the true inverse transfer function of the optical receiver according to the embodiment of the present invention.

FIG. 18 is a flowchart to estimate the true transfer function or the true inverse transfer function of the optical receiver according to the embodiment of the present invention. First, the known signal is input to the input of the transmission signal processing unit 4, and the optical modulation signal is transmitted from the optical transmitter 7 of the transmission unit 1 to the reception unit 3 (step S301). At this time, the inverse transfer function of the optical transmitter 7 estimated in step S2 of FIG. 2 is set to the transmitter compensation unit 6 to compensate the transmission characteristics of the optical transmitter 7. Note that the transmitter compensation unit 6 can include the configuration same as the configuration of the receiver compensation unit 11 illustrated in FIG. 5.

Next, the reception data is acquired by the data buffer 10 on the reception side (step S302). The second receiver transfer function estimation unit 14 acquires the digital data from the data buffer 10 (step S303). The known signal synchronization unit 14a extracts the known signal from the acquired digital data. The extracted known signal is supplied to the FIR filter 14c as the adaptive filter. On the other hand, chromatic dispersion, frequency offset, polarization dispersion/polarization rotation, clock phase, and phase noise that are estimated as the transmission line distortion are added to the known signal, and the resultant signal is compared with the output of the adaptive filter. An addition amount of each of the chromatic dispersion, the frequency offset, the polarization dispersion/polarization rotation, the clock phase, and the phase noise is estimated by the various estimation blocks from the state of the known signal.

At this time, the transfer function of the optical transmitter 7 is regarded to have been compensated by the transmitter compensation unit 6 at the output of the adaptive filter. When the transfer function of the optical receiver 9 is compensated by the adaptive filter, the output of the adaptive filter is influenced only by the transmission line distortion. The signal is compared with the known signal added with the transmission line distortion, and difference therebetween (square error) is minimized. As a result, the filter coefficients of the FIR filter 14c as the adaptive filter can be determined as time response of the inverse transfer function of the optical receiver 9. The method of determining the inverse transfer function is generally known as Wiener solution or the LMS algorism described below.

$$e(n)=d(n)-y(n)=d(n)-h(n)^T x(n)$$

$$h(n)=[x(n)^T x(n)]^{-1} x(n)^T d(n) \text{ Wiener Solution}$$

$$h(n+1)=h(n)+\mu e(n)x(n) LMS \qquad [\text{Math. 5}]$$

where d(n) is the known signal, y(n) is the output of the adaptive filter, e(n) is the difference between the known signal d(n) and the output y(n) of the adaptive filter, and h(n) is the time response of the adaptive filter.

In the above-described example, the true inverse transfer function of the optical transmitter 7 can be directly determined by the adaptive equalization circuit. Therefore, step S303 and step S304 can be integrally processed. In contrast, in the case where the true transfer function of the optical receiver 9 is determined, the true inverse transfer function is calculated from the transfer function (step S304).

Next, the estimated true inverse transfer function of the optical receiver 9 is set to the receiver compensation unit 11 (step S305). The setting method is the same as the method described in step S105. At this time, as described above, each of the lanes XI, XQ, YI, and YQ can be independently processed. In this case, the delay difference among the lanes can be extracted and compensated.

Figure 19:
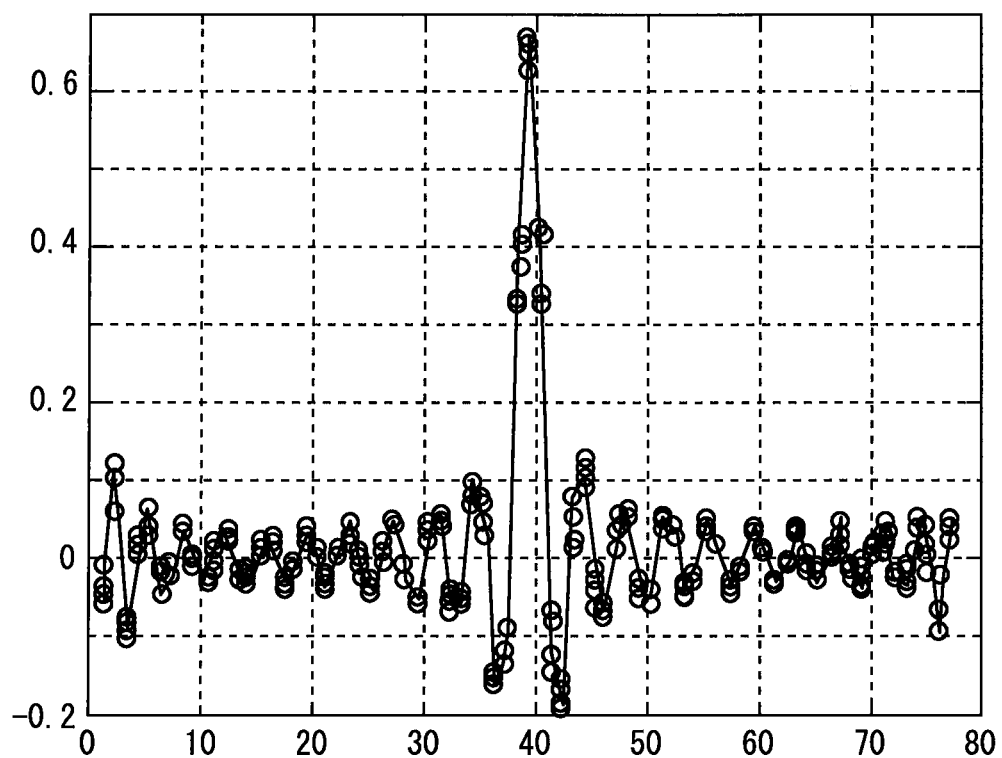
FIG. 19 is a diagram illustrating the time response of the inverse transfer function of the optical receiver determined by the second receiver transfer function estimation unit.
Figure 20:
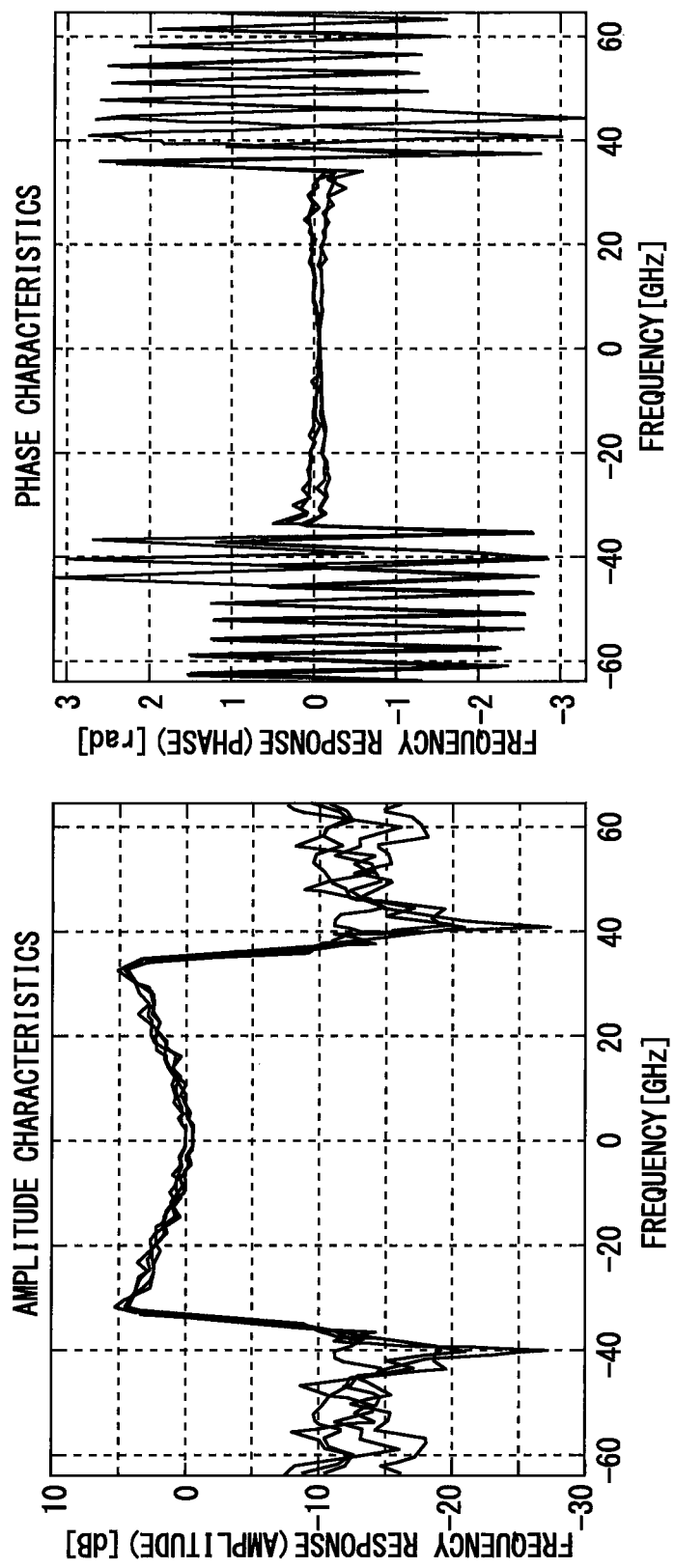
FIG. 20 is a diagram illustrating the frequency response (amplitude characteristics and phase characteristics) of the inverse transfer function of the optical receiver determined by the second receiver transfer function estimation unit.

The true transfer function or the true inverse transfer function of the optical receiver 9 can be determined by the second receiver transfer function estimation unit 14 in the above-described manner. FIG. 19 is a diagram illustrating the time response of the inverse transfer function of the optical receiver determined by the second receiver transfer function estimation unit. FIG. 20 is a diagram illustrating the frequency response (amplitude characteristics and phase characteristics) of the inverse transfer function of the optical receiver determined by the second receiver transfer function estimation unit.

Figure 21:
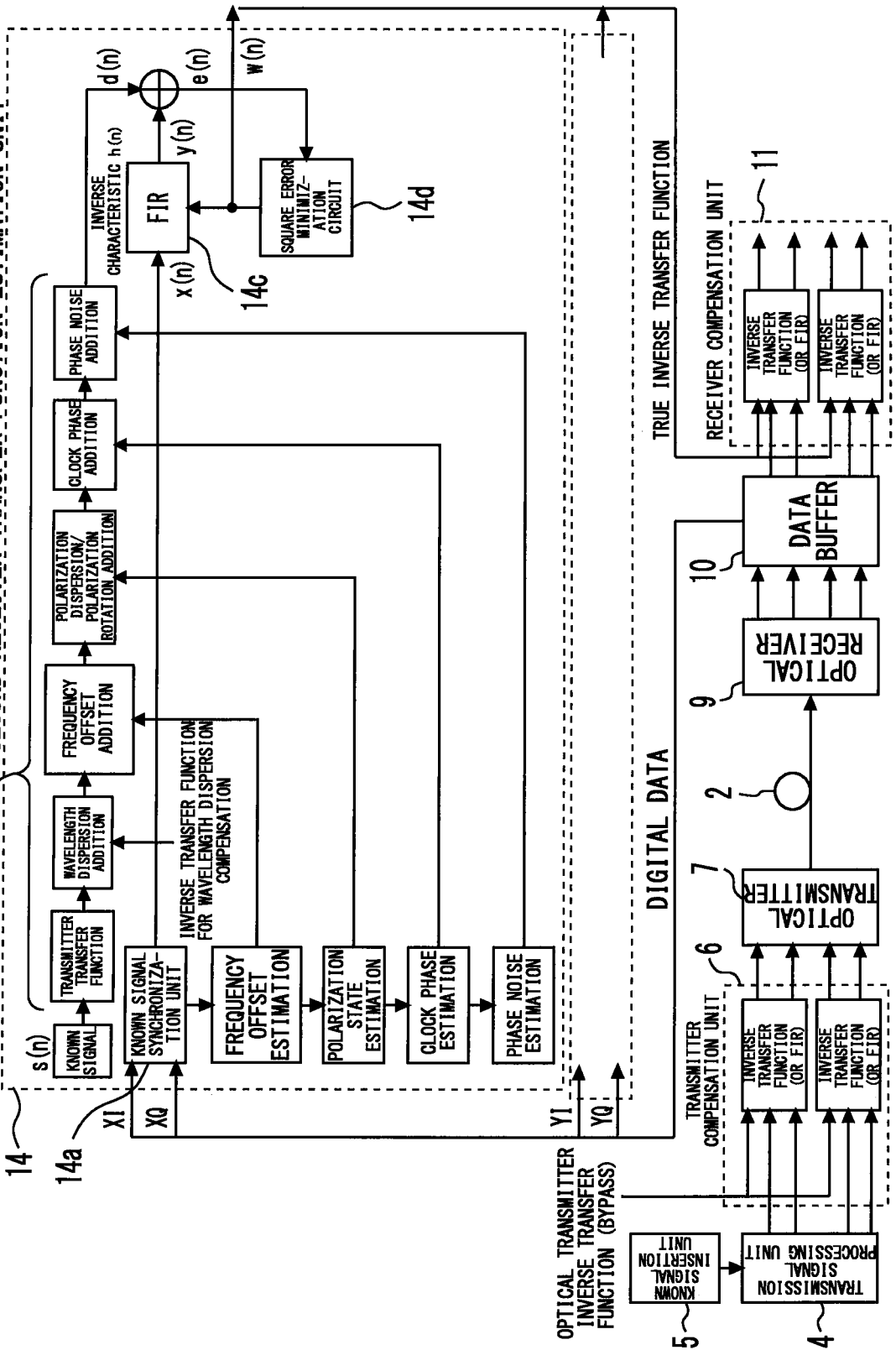
FIG. 21 is a diagram illustrating a second receiver transfer function estimation unit according to the embodiment 2 of the present invention.

FIG. 21 is a diagram illustrating a second receiver transfer function estimation unit according to the embodiment 2 of the present invention. Unlike the embodiment 1 illustrated in FIG. 13, the transmitter compensation unit 6 is bypassed in step S301 illustrated in FIG. 18, and the transmission line distortion and the transfer function of the optical transmitter 7 are added to the known signal in step S303. The other processing is the same as the processing according to the embodiment 1. In the present embodiment, setting on the transmission side is unnecessary. Therefore, the transfer function or the inverse transfer function of the optical transmitter 7 and the transfer function and the inverse transfer function of the optical receiver 9 can be estimated only by calculation on the reception side. In this case, these estimation calculation can be implemented by a single device. In particular, these estimation calculation can be easily implemented by a PC including an interface to take in the digital data of the data buffer 10.

Figure 22:
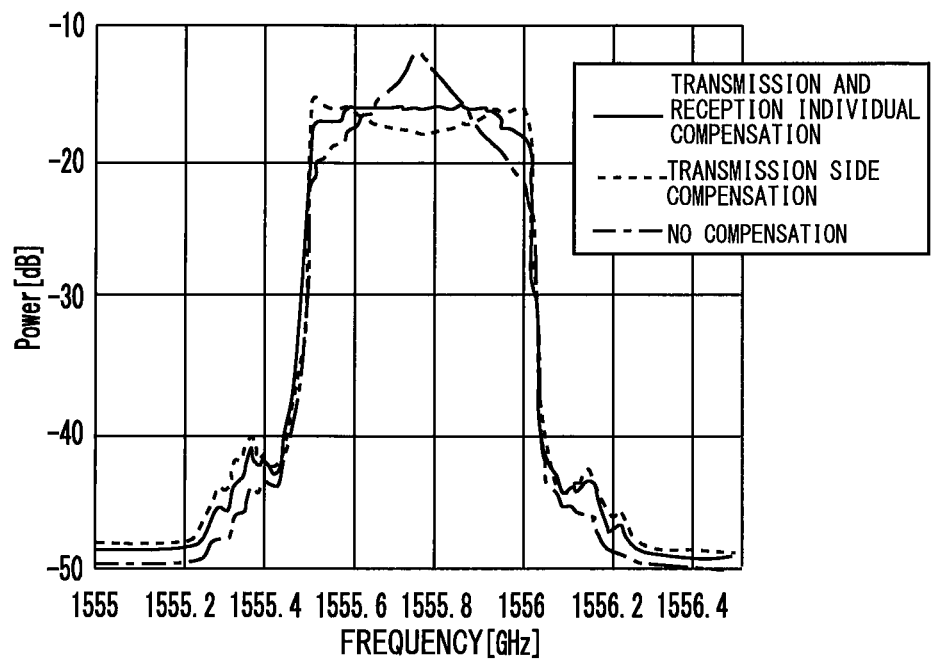
FIG. 22 is a frequency spectrum after the compensation by the optical transmission characteristic compensation method according to the embodiment of the present invention.

FIG. 22 is a frequency spectrum after the compensation by the optical transmission characteristic compensation method according to the embodiment of the present invention. In a case where the compensation of the optical transceiver is not performed, both shoulders of the spectrum drop due to the frequency band characteristics of the optical transmitter 7. In contrast, in the case where the compensation is performed only on the transmission side without separating the reception-side frequency characteristics, both shoulders of the frequency characteristics of the optical receiver 9 rise as a result. Further, in a case where the compensation is individually performed on the optical transmitter 7 side and on the optical receiver 9 side, an ideal rectangular spectrum can be confirmed. In the optical transmission, noise (flat in band) by the optical amplifier is dominant. Therefore, influence of noise enhancement can be avoided in the case where the optical spectrum has the ideal shape (rectangle in this case). As described above, in order to suppress influence of the noise enhancement, it is important that the transfer function of the optical transmitter 7 is compensated on the optical transmitter 7 side and the transfer function of the optical receiver 9 is compensated on the optical receiver 9 side. This can be achieved by the embodiment according to the present invention.

Figure 23:
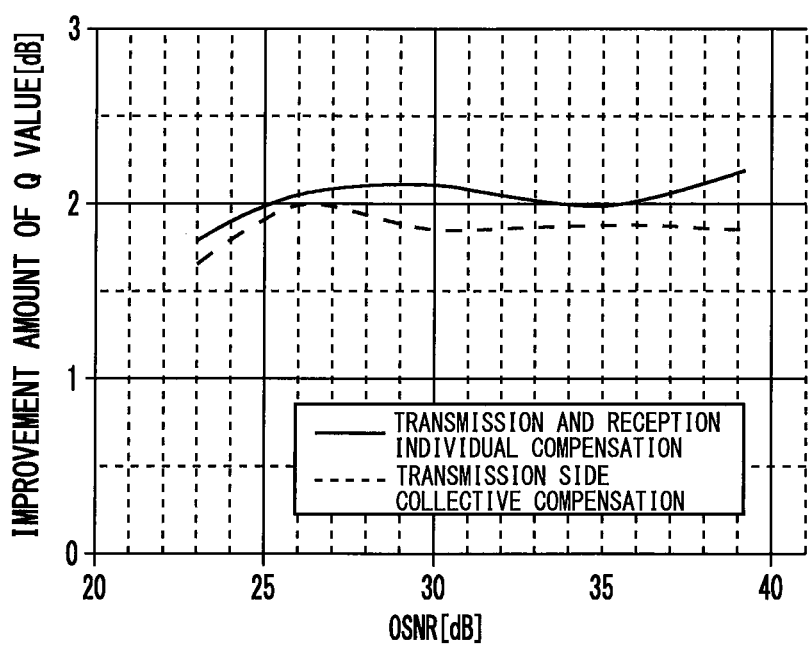
FIG. 23 is a diagram illustrating Q-value improvement effect after the compensation by the optical transmission characteristic compensation method according to the embodiment of the present invention.

FIG. 23 is a diagram illustrating Q-value improvement effect after the compensation by the optical transmission characteristic compensation method according to the embodiment of the present invention. The Q value is an index indicating error rate. The higher Q value is obtainable as the error rate is lower. An OSNR is an optical signal-to-noise ratio. As with the spectrum illustrated in FIG. 22, an improvement amount of the Q value to the wide OSNR is larger in the case where the compensation is individually performed on the optical transmitter 7 side and the optical receiver 9 side also in this case.

As described above, according to the present embodiment, the transfer function or the inverse transfer function of the optical transmitter 7 and the transfer function or the inverse transfer function of the optical receiver 9 can be estimated. In other words, it is possible to estimate the transmission characteristics of each of the optical transmitter 7 and the optical receiver 9. The transfer functions or the inverse transfer functions are set to the transmitter compensation unit 6 and the receiver compensation unit 11, which makes it possible to individually compensate the transfer function of the optical transmitter 7 and the transfer function of the optical receiver 9. As a result, the transmission characteristics of each of the optical transmitter 7 and the optical receiver 9 can be compensated, which makes it possible to obtain optimum transmission characteristics as illustrated in FIG. 22 and FIG. 23. Further, the optical transmission characteristic estimation method, the optical transmission characteristic compensation method, the optical transmission characteristic estimation system, and the optical transmission characteristic compensation system according to the present embodiment are easily implemented by a PC or the like, which is useful as a calibration system in optical communication.

Further, in the present embodiment, the transmission unit 1 and the reception unit 3 are connected, the temporary transfer function or the temporary inverse transfer function of the optical receiver 9 of the reception unit 3 is determined, the transfer function or the inverse transfer function of the optical transmitter 7 in the transmission unit 1 is determined with use of the temporary transfer function or the temporary inverse transfer function of the optical receiver 9, and the true transfer function or the true inverse transfer function of the optical receiver 9 is finally determined. In a case where the transfer function or the inverse transfer function of one of the optical transmitter 7 and the optical receiver 9 is previously acquired or calibrated, however, the transfer function or the inverse transfer function of the other of the optical transmitter 7 and the optical receiver 9 can be estimated from the digital data in the reception unit 3 when the known signal is transmitted from the transmission unit 1 to the reception unit 3 and the transfer function or the inverse transfer function previously acquired or calibrated. In this case, the transfer function or the inverse transfer function of each of a plurality of apparatuses can be determined by sequentially changing only the apparatus side including an unknown transfer function. These methods are also included in the technical idea of the present invention.

Further, step S2 and step S3 illustrated in the flowchart of FIG. 2 may be repeated two or more times with use of the true transfer function or the true inverse transfer function of the optical receiver 9 estimated in step S3 as the temporary transfer function or the temporary inverse transfer function of the optical receiver 9 in step S2. This makes it possible to estimate the transfer function or the inverse transfer function of the optical transceiver with higher accuracy. This is also included in the technical idea of the present invention.

REFERENCE SIGNS LIST

1 transmission unit; 2 transmission line; 3 reception unit; 6 transmitter compensation unit; 7 optical transmitter; 8 transmitter transfer function estimation unit; 9 optical receiver; 11 receiver compensation unit; 13 first receiver transfer function estimation unit; 14 second receiver transfer function estimation unit

What is claimed is:

1. An optical transmission characteristic estimation method estimating transmission characteristics of an optical transmitter of a transmission unit and an optical receiver of a reception unit which are connected to each other via a transmission line by an optical transmission characteristic estimation system, comprising:

an estimation step of estimating a temporary transfer function or a temporary inverse transfer function of the optical receiver only at the reception unit;

a first step of estimating a transfer function or an inverse transfer function of the optical transmitter from first data acquired by the reception unit when a first known signal is transmitted from the transmission unit to the reception unit, and the temporary transfer function or the temporary inverse transfer function of the optical receiver estimated in the estimation step, such that a difference between the first known signal of the first data and an original first known signal is minimized; and a second step of estimating a transfer function or an inverse transfer function of the optical receiver from second data acquired by the reception unit when a second known signal is transmitted from the transmission unit to the reception unit, and the transfer function or the inverse transfer function of the optical transmitter estimated in the first step, such that a difference between the second known signal of the second data and an original second known signal is minimized.

2. The optical transmission characteristic estimation method according to claim 1, wherein in the estimation step, the temporary transfer function or the temporary inverse transfer function of the optical receiver are estimated from third data acquired by the reception unit when a test signal having a known spectrum is input to an input end of the optical receiver.

3. The optical transmission characteristic estimation method according to claim 2, wherein the temporary transfer function or the temporary inverse transfer function of the optical receiver is estimated with use of an adaptive filter.

4. The optical transmission characteristic estimation method according to claim 1, wherein estimation of the transfer function or the inverse transfer function of the optical transmitter and estimation of the transfer function or the inverse transfer function of the optical receiver include processing to estimate transmission characteristics of the transmission line.

5. The optical transmission characteristic estimation method according to claim 1, wherein the transfer function or the inverse transfer function of the optical transmitter and the transfer function or the inverse transfer function of the optical receiver are estimated with use of an adaptive filter.

6. The optical transmission characteristic estimation method according to claim 1, wherein when the second known signal is transmitted from the transmission unit to the reception unit, transmission characteristics of the optical transmitter are compensated with use of the estimated transfer function or the estimated inverse transfer function of the optical transmitter.

7. The optical transmission characteristic estimation method according to claim 1, wherein the first step and the second step are repeated two or more times with use of the transfer function or the inverse transfer function of the optical receiver estimated in the second step as the temporary transfer function or the temporary inverse transfer function of the optical receiver in the first step.

8. An optical transmission characteristic compensation method comprising a step of compensating transmission characteristics of the optical transmitter and the optical receiver by an optical transmission characteristic compensation system with use of the transfer function or the inverse transfer function of the optical transmitter and the transfer function or the inverse transfer function of the optical receiver estimated by the optical transmission characteristic estimation method according to claim 1.

9. An optical transmission characteristic estimation system estimating transmission characteristics of an optical transmitter of a transmission unit and an optical receiver of a reception unit which are connected to each other via a transmission line, comprising:
a temporary receiver transfer function estimation unit estimating a temporary transfer function or a temporary inverse transfer function of the optical receiver only at the reception unit;
a transmitter transfer function estimation unit estimating a transfer function or an inverse transfer function of the optical transmitter of a transmission unit from first data acquired by the reception unit when a first known signal is transmitted from the transmission unit to the reception unit, and the temporary transfer function or the temporary inverse transfer function of the optical receiver estimated by the temporary receiver transfer function estimation unit, such that a difference between the first known signal of the first data and an original first known signal is minimized; and
a receiver transfer function estimation unit estimating a transfer function or an inverse transfer function of the optical receiver from second data acquired by the reception unit when a second known signal is transmitted from the transmission unit to the reception unit, and the transfer function or the inverse transfer function of the optical transmitter estimated by the transmitter transfer function estimation unit, such that a difference between the second known signal of the second data and an original second known signal is minimized.

10. The optical transmission characteristic estimation system according to claim 9, the temporary receiver transfer function estimation unit estimates the temporary transfer function or the temporary inverse transfer function of the optical receiver from third data acquired by the reception unit when a test signal having a known spectrum is input to an input end of the optical receiver.

11. The optical transmission characteristic estimation system according to claim 10, wherein the temporary transfer function or the temporary inverse transfer function of the optical receiver is estimated with use of an adaptive filter.

12. The optical transmission characteristic estimation system according to claim 9, wherein estimation of the transfer function or the inverse transfer function of the optical transmitter and estimation of the transfer function or the inverse transfer function of the optical receiver include processing to estimate transmission characteristics of the transmission line.

13. The optical transmission characteristic estimation system according to claim 9, wherein the transfer function or the inverse transfer function of the optical transmitter and the transfer function or the inverse transfer function of the optical receiver are estimated with use of an adaptive filter.

14. The optical transmission characteristic estimation system according to claim 9, wherein when the second known signal is transmitted from the transmission unit to the reception unit, the transmission unit compensates transmission characteristics of the optical transmitter with use of the estimated transfer function or the estimated inverse transfer function of the optical transmitter.

15. An optical transmission characteristic compensation system comprising:
the optical transmission characteristic estimation system according to claim 9;
a transmitter compensation unit compensating transmission characteristics of the optical transmitter with use of the estimated transfer function or the estimated inverse transfer function of the optical transmitter; and
a receiver compensation unit compensating transmission characteristics of the optical receiver with use of the estimated transfer function or the estimated inverse transfer function of the optical receiver.

* * * * *